(12) United States Patent
Law et al.

(10) Patent No.: US 7,076,312 B2
(45) Date of Patent: *Jul. 11, 2006

(54) INTEGRATED ELECTRONIC SIGNATURES FOR APPROVAL OF PROCESS CONTROL AND SAFETY SYSTEM SOFTWARE OBJECTS

(75) Inventors: Gary K. Law, Georgetown, TX (US); David L. Deitz, Austin, TX (US); Trevor Duncan Schleiss, Austin, TX (US); Julian Naidoo, Cedar Park, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 338 days.

This patent is subject to a terminal disclaimer.

(21) Appl. No.: 10/666,446

(22) Filed: Sep. 19, 2003

(65) Prior Publication Data

US 2004/0243260 A1 Dec. 2, 2004

Related U.S. Application Data

(63) Continuation-in-part of application No. 10/352,396, filed on Jan. 28, 2003, and a continuation-in-part of application No. 10/211,903, filed on Aug. 2, 2002, now Pat. No. 6,928,328.

(51) Int. Cl.
*G05B 11/01* (2006.01)

(52) U.S. Cl. ............................. 700/23; 700/18; 700/86; 700/87; 700/88; 717/168; 717/178; 717/179

(58) Field of Classification Search ................... 700/23, 700/78, 86, 87, 88, 17, 21, 83; 717/168–178, 717/179, 120–123; 713/100; 705/51, 54; 707/203, 8, 201; 715/174–178, 511
See application file for complete search history.

(56) References Cited

U.S. PATENT DOCUMENTS

| | | | | |
|---|---|---|---|---|
| 4,827,423 A | | 5/1989 | Bearsley et al. ............. | 364/468 |
| 5,339,430 A | * | 8/1994 | Lundin et al. ............... | 719/332 |
| 5,546,301 A | | 8/1996 | Argrawal et al. ............. | 700/23 |
| 5,602,993 A | | 2/1997 | Stromberg ................... | 717/173 |
| 5,649,200 A | | 7/1997 | Leblang et al. ............. | 717/122 |
| 5,768,119 A | | 6/1998 | Havekost et al. ........... | 364/133 |
| 5,838,563 A | | 11/1998 | Dove et al. ................. | 364/188 |
| 5,903,897 A | | 5/1999 | Carrier et al. .............. | 707/203 |

(Continued)

OTHER PUBLICATIONS

Ames et al., "Applications of Web-Based Workflow," System Sciences, 79-87 (1998).

(Continued)

*Primary Examiner*—Ramesh Patel
(74) *Attorney, Agent, or Firm*—Marshall, Gerstein & Borun LLP

(57) ABSTRACT

A software object approval system is integrated with a process control or safety system environment and, in particular, with a process control or safety system design environment to implement and manage electronic approval of new software objects created within the process control and safety system environment. The software object approval system electronically generates identification information representing a group of entities whose approval is needed prior to implementing a software object within the process control or safety system. The system may then send the software object to the entities and receive from each entity an electronic indication regarding approval of the software object. The approval system prevents the process control or safety system from implementing the software object until each entity within the group of entities approves the software object.

57 Claims, 16 Drawing Sheets

U.S. PATENT DOCUMENTS

| | | | |
|---|---|---|---|
| 5,940,294 A | 8/1999 | Dove | 364/188 |
| 5,950,209 A | 9/1999 | Carrier et al. | 707/203 |
| 6,047,129 A | 4/2000 | Frye | 717/172 |
| 6,078,320 A | 6/2000 | Dove et al. | 345/333 |
| 6,314,425 B1* | 11/2001 | Serbinis et al. | 707/10 |
| 6,381,698 B1* | 4/2002 | Devanbu et al. | 713/170 |
| 6,385,494 B1 | 5/2002 | Blahnik et al. | 700/86 |
| 6,385,496 B1* | 5/2002 | Irwin et al. | 700/87 |
| 6,438,432 B1 | 8/2002 | Zimmermann et al. | 700/86 |
| 6,445,963 B1 | 9/2002 | Blevins et al. | 700/44 |
| 6,449,624 B1 | 9/2002 | Hammack et al. | 707/203 |
| 6,647,315 B1 | 11/2003 | Sherriff et al. | 700/204 |
| 6,928,328 B1* | 8/2005 | Deitz et al. | 700/87 |

OTHER PUBLICATIONS

Chan et al., "Software Configuration Management Tools," Software Technology and Engineering Practice, Proceedings Eighth IEEE International Workshop on Yincorporating Computer Aided Software Engineering, 238-250 (1997).

Merant: "Change Management Capabilities," PVCS Dimensions [On-line] Available: http://nsit.uchicago.edu/rpa/documents/configuration/Merant/change_mgnt_capabilities.pdf (2001).

International Search Report issued in PCT/US2004/001205 mailed on Apr. 29, 2005.

Written Opinion issued in PCT/US2004/001205 mailed Apr. 29, 2005.

* cited by examiner

INTEGRATED ELECTRONIC SIGNATURES FOR APPROVAL OF PROCESS CONTROL AND SAFETY SYSTEM SOFTWARE OBJECTS

RELATED APPLICATIONS

This application is a continuation-in-part application claiming priority from U.S. patent application Ser. No. 10/211,903, now U.S. Pat. No. 6,928,328, entitled "Integrated Electronic Signatures for Approval of Process Control System Software Objects," which was filed on Aug. 2, 2002 and co-pending U.S. patent application Ser. No. 10/352,396 entitled "Process Control System with an Embedded Safety System," which was filed on Jan. 28, 2003, the entire disclosure of which is hereby expressly incorporated by reference herein.

TECHNICAL FIELD

The present application pertains to process control systems and, more particularly, to approval of software objects for use in process control systems.

BACKGROUND

Process control systems typically include numerous sets of equipment that are used to carry out certain manufacturing or other control processes. The sets of equipment are coupled to controllers that include process control software instructions for manipulating the equipment in certain manners to effectuate the manufacturing or control processes. Process control software may be implemented in software objects run on the controller (or other computer) to perform any of a variety of control functions. For example, in some process control situations, software objects may be arranged to implement different phases, which are generically related to various types of process steps. In particular, a software object that implements a mixing phase may be associated with hardware that carries out a mixing step of a process. As will be understood, each software object implementing a phase performs some discrete function and communicates with other objects to implement a more complex control procedure.

When defining or creating a control procedure to be used in, for example, a batch process, an engineer may start with template software objects having generic control logic therein for implementing a particular function, such as a phase in the batch process. Due to the generic nature of these template software objects, the software objects must be modified or customized based on the particulars of the step that they are to execute before being used ip a particular process control environment. For example, a mixing phase, which is generally adapted to operate mixing equipment, must be customized to operate a particular piece of mixing equipment for particular time durations at particular speeds. Recipes are commonly used to customize or modify phases. As the name implies, recipes include sets of instructions downloaded to process control hardware for carrying out specific tasks such as, for example, making cookies, producing pharmaceuticals or controlling other processes. Recipes are typically more specific than phases and, in fact, include the use of phases therein. For example, a cookie-making recipe may include a mixing step that could be carried out by a mixing phase. However, in contrast to the mixing phase, the cookie making recipe specifies the duration and speed at which mixing should be carried out. Accordingly, the recipe specifies the parameters, that define the operation of the mixing phase.

In a similar manner, software objects may be created for use in safety instrumented systems which are used to provide safety or shut-down procedures or other safety-related functions in a process plant being controlled by a separate process control system. Typically, a safety instrumented system may have one or more safety controllers that are programmed, using safety related software objects, to detect hazardous, dangerous or undesirable conditions within the process plant and to take some action, such as shutting the process down, diverting flow within the process, removing power, etc. when such a condition is detected.

As will be readily appreciated, altering a recipe executed by a process control system or altering a safety system software object could drastically affect the operation of the process control system or the safety system. For example, downloading a recipe that has been accidentally altered or otherwise changed in an unauthorized manner could detrimentally affect the output of a process plant, resulting in products that do not comply with product specifications and, as a result, lost profits. While the alteration of a recipe (which may be implemented as a software object) for products such as cookies may yield cookies that are obviously flawed (e.g., not thoroughly cooked, not having enough chocolate chips, etc.), not all recipe alterations will result in products with immediately perceptible flaws. For example, cookies having too much salt may not be easily discovered during the production process. Consumers, however, may notice the saltiness of the cookies and may complain to the manufacturer, which may then determine that the recipe for the cookies was altered in an unacceptable manner leading to a recall of the cookies. While, in cases like cookie production, unauthorized recipe alteration may, at worst, lead to consumer dissatisfaction, unauthorized alteration of recipes used in, for example, pharmaceutical production may have more serious implications. In particular, a recipe alteration that changes the quantities or constituents of a drug may render the resulting drug ineffective or toxic. Additionally, the alteration of drug constituents is not, unlike the quantity of chocolate chips in a cookie, readily detectable because the drug may appear to have the same color and consistency as an unaltered or properly manufactured drug.

In a similar manner, the unauthorized or incorrect alteration of software objects used in safety systems could result in a hazardous condition not being detected or an inappropriate action being taken in response to a hazardous condition, which could be life threatening to those working in or living near the plant, not to mention detrimental to the plant itself. Additionally, a faulty safety system software object could falsely detect a hazardous condition and shut down the plant when no hazardous condition actually exists.

Because plant production lines typically involve significant investment in production capacity, time and/or material, having to scrap a production in progress due to a faulty recipe or a faulty activation of the safety system may have a substantial adverse financial impact on the entity carrying out the production run as well as any other entities that expect to receive product produced by the production run. For example, recipes for making products that involve fermentation such as wine, beer, cheese, etc. often require weeks or months of process time as well as substantial material investments.

Typically, recipes for process control systems, as well as other software modules or objects including safety system software objects are written by an engineer or scientist who requests various entities such as, for example, research or production groups, to approve the recipe or the safety system software before it is downloaded to the process control system or the safety system. However, the approval process for process control system software is typically carried out by circulating a memorandum or a request for approval and, in some cases, by requesting input in more informal manners. Additionally, there is rarely an impediment, other than a working knowledge of the process control system and the recipes and other software objects implemented therein, to prevent downloading unapproved software to the process control system or the safety system for use on-line within the process plant.

In facilities employing a safety instrumented system, such as oil and gas refining, etc. there has been an attempt to implement standard operating procedures (SOPs) that require one or more individuals from the organization to manually denote their approval of particular piece of software before the software may be executed in a production system. In fact, the draft standard IEC 615511 requires such approval, in addition to defining different approval levels for differing safety integrity levels (SIL). For example the validation plan for a facility may include SOPs requiring safety functions that are to be executed by the safety instrumented system to be approved by a peer in the same department if the SIL is level 2 or below and by a peer in a different department if the SIL is level 3 or above.

As is known, a SIL is a measure defined in the IEC 61508 standard which defines the integrity of a system with respect to how well the system can be counted on to do what it is supposed to do when it is supposed to do it. More particularly, the SIL is defined by the average probability of failure on demand (PFDavg). The risk reduction factor, which is related to the reciprocal of the PFDavg, defines the difference between the process risk before a safety instrumented function is used and the "tolerable level" of risk which much be achieved for that process or piece of equipment. Basically, the risk reduction factor is the "unmitigated risk" without a safety instrumented function divided by the established "tolerable risk". Both the risk reduction factor and the SIL are defined for each different safety instrumented function within a safety system, wherein an individual safety instrumented function is designed to identify a need and then act to bring the system to a safe state for each hazard scenario.

In facilities where a safety instrumented function approval process has been implemented, approvals are typically handled using one of two possible approaches including a manual approach and an electronic approach. In the manual approach, a printed copy of the software object (i.e., a printed copy of the safety function software) to be approved is manually routed to each of the approvers for review, and all approval signatures are collected manually in a paper format. In the electronic approach, an electronic document management system is used to route an electronic version of the software object (i.e., a series of screen captures or other text and graphical based documentation that describes the software) to each of the required approvers for review. In this case, all approval signatures are collected in an electronic format.

However, there are serious short-comings with both of these approaches. In particular, there is no direct linkage between the document approval process and the safety instrumented system where the software executes. Because the document approval process occurs outside of the safety instrumented system, approvers are unable to review the software object they are being asked to approve in its native environment (e.g., within the safety instrumented system) and, as a result, there may be issues with respect to the accuracy of the document being reviewed. Furthermore, because the document approval process occurs outside of the safety instrumented system or the design system associate therewith, there are no mechanisms within the safety instrumented system that can guarantee that an unapproved software object cannot be executed until all approvals are in place or that can guarantee that all prior approvals for a software object are revoked (i.e., that the software goes to the unapproved state) if a change is made to the software object.

Additionally, a separate approval and safety design system makes it impossible for the system to keep a record of approvals within the software development audit trail for the software object. Moreover, because the approval system is not linked to the safety instrumented system, both systems must be independently validated, which is time consuming and repetitive.

SUMMARY

A software object approval system is integrated with a process control or safety system environment and, in particular, with a process control or safety system design environment to implement and manage electronic approval of new software objects created within the process control system and safety system environments. For example, a system and method for use in a process control system and/or safety system electronically generates identification information representing a group entities whose approval is needed prior to implementing a software object within the process control or safety system. The system and method may receive from each entity represented within the identification information an electronic indication regarding approval of the software object and may prevent the process control or safety system from implementing the software object until each entity represented within the identification information approves the software object. Still further, the system and method selectively enable the process control or safety system to implement the software object based on the electronic indications.

The software object approval system and method for use in a process control or safety system may also or instead determine that a software object is not approved in response to receiving an electronic indication that at least one of a plurality of entities has not approved the software object or when the software object is changed or altered in some manner. The system and method may thereafter determine that the software object is approved in response to receiving another electronic indication that each one of the plurality of entities has approved the software object and, in response to such approval, the system and method may enable downloading of the software object to the process control or safety system.

DETAILED DESCRIPTION

Figure 1:
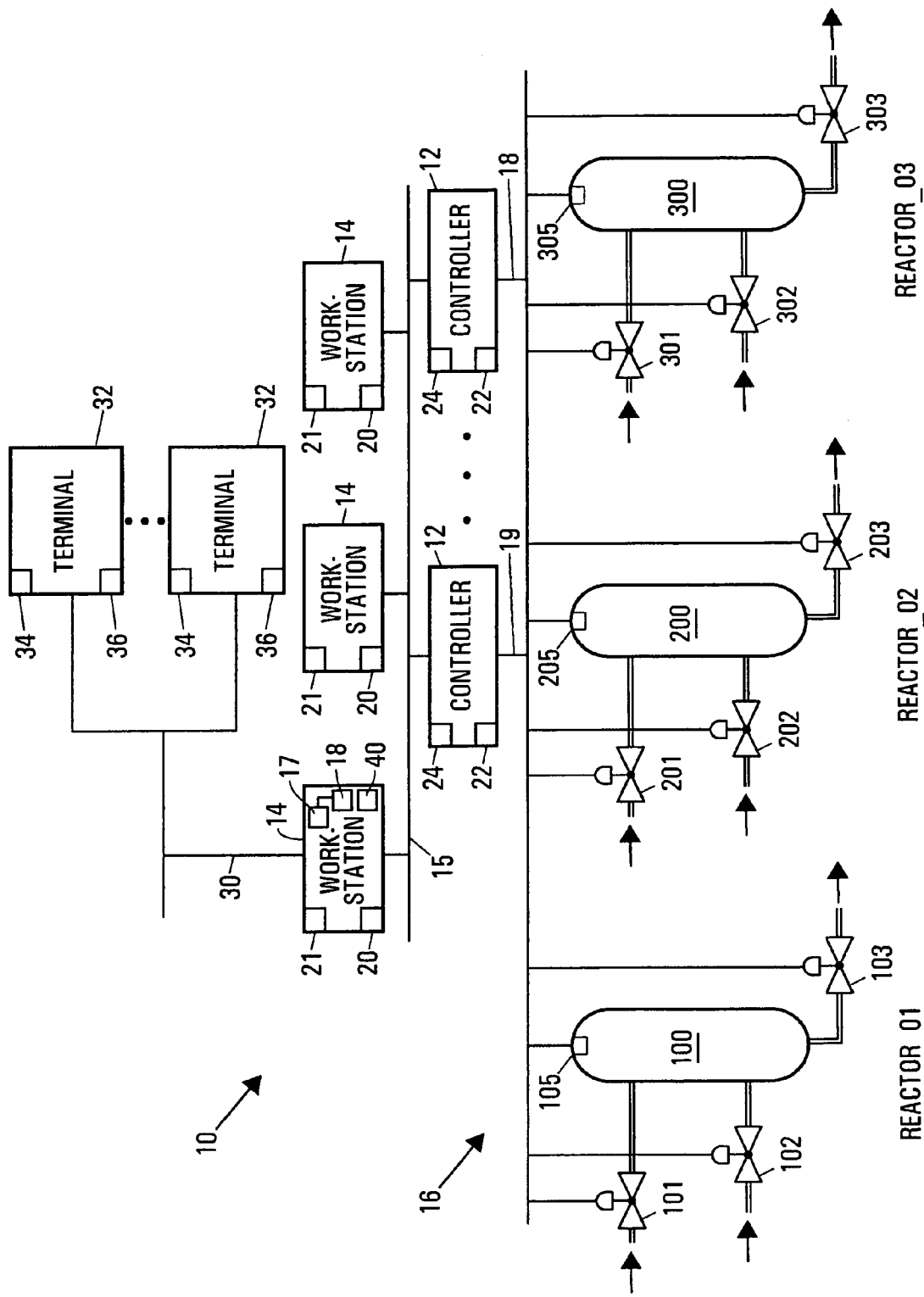
FIG. 1 is a partial block diagram of a process control system that includes an integrated electronic software object approval system therein to approve of one or more control software objects that perform control of process equipment.

Methods and systems for electronically controlling the approval and downloading of software objects such as, for example, recipes in process control systems or software routines in safety instrumented systems are described in detail below and may be used to enable an author of a software object to automatically and/or electronically obtain the approval of the persons or groups of reviewers that must authorize a software object before the object is downloaded to or implemented within the process control system or the safety instrumented system. These methods and systems enable the reviewers to review the software object in the environment in which it will be used so that the software object being reviewed is as accurate as possible. Additionally, because the approval system is integrated with the process control or safety system design environment, the approval system can provide a mechanism to assure that an unapproved software object cannot be executed until all approvals are in place and that all prior approvals for a software object are revoked (i.e., that the software goes to the unapproved state) if a change is made to the software object. Additionally, the integrated software object approval system makes it possible for the process control or safety system to maintain an accurate record of approvals within the software development audit trail for the software object.

If desired, the reviewers or signers of a software object may be notified by a number of different techniques and, upon notification, may review the software object and approve or reject the software object. If each of the reviewers approves the software object, the software object may be made available for download to the process control system or to the safety instrumented system. Additional functionality may include enabling various persons or entities (e.g., reviewers, authors, business groups or others) to check the approval status of a software object, automatically removing the authorization if the software object is changed, automatically changing the version of the software object when changes are made, etc.

While the software object approval system and method is described by way of example below as being used for the approval and downloading of recipes within a process control system, or for the approval and downloading of software objects in a safety system environment, the system and method described herein may also be advantageously used for other types of software objects such as, for example, units, phases, graphics, etc. in other process control environments. Further, the software object approval system and method described by way of example herein, may be used to approve and download a single software object at one time and/or groups of related or unrelated software objects at the same or at different times.

Additionally, as will be readily appreciated, the software object approval system and method described herein could be advantageously used in connection with version control software. One exemplary type of version control software is disclosed in U.S. Pat. No. 6,449,624 entitled "Version Control and Audit Trail in a Process Control System," the entire disclosure of which is hereby expressly incorporated by reference herein.

Referring now to FIG. 1, an example process control system 10 includes controllers 12 coupled to a plurality of workstations 14 via an Ethernet connection 15. The controllers 12 are also coupled to devices or equipment associated with a process (generally designated by the reference numeral 16) via a set of communication lines or a bus 19. The controllers 12, which may be, by way of example only, the DeltaV™ controllers sold by Emerson Process Management are capable of communicating with control elements, such as field devices and function blocks within field devices distributed throughout the process 16 to perform one or more process control routines or software objects, which are preferably implemented using object-oriented programming techniques, to thereby implement desired control of the process 16. The workstations 14 (which may be, for example, personal computers) may include design software 17 that is used by one or more engineers or other users to design process control routines or software objects to be executed by the controllers 12, to communicate with the controllers 12 to download such process control routines or software objects and to receive and display information pertaining to the process 16 during operation of the process 16. In addition, approval software 18 may be communicatively connected to and integrated with the design software 17 to provide for the approval of any of the recipes or other process control routines or objects designed or modified using the design software 17.

Each of the workstations 14 includes a memory 20 for storing applications, such as configuration design applications, and for storing data, such as configuration data pertaining to the configuration of the process 16. Each of the workstations 14 also includes a processor 21 that executes the applications 17 and 18 to enable a user to design and/or modify process control routines or software objects and to download these process control routines or software objects to the controllers 12. Likewise, each of the controllers 12 includes a memory 22 for storing configuration data and process control routines to be used to control the process 16 and includes a processor 24 that executes the process control routines to implement a process control strategy. If the controllers 12 are DeltaV controllers, they may provide a graphical depiction of the process control routines within the controllers 12 to a user via one of the workstations 14 illustrating the control elements within the process control routine and the manner in which these control elements are configured to provide control of the process 16.

The system 10 of FIG. 1 may also include a network 30 to which one or more of the workstations 14 may be connected. The network 30 may be implemented using any suitable network such as, for example, the Internet, an intranet, a local area network (LAN), a wide area network (WAN) or any other suitable network. Although the network 30 is shown as having hardwired connections, it will be readily appreciated that such a network could be a wireless network or could be a network including both hardwired and wireless portions.

A number of terminals 32 may also be connected to the workstations 14 via the network 30. Each of the terminals 32 may include a memory 34 coupled to a processor 36 that is adapted to execute instructions stored on the memory 34. In one exemplary embodiment, the terminals 32 may be personal computers or any like processing devices that may include the same or more processing power and memory than is available in conventional personal computers known today.

Returning to the description of the process control system 10 of FIG. 1, the controllers 12 are communicatively connected via a bus 19 to three sets of similarly configured reactors referred to herein as Reactor_01, Reactor_02 and Reactor_03. Reactor_01 includes a reactor vessel 100, two input valves 101 and 102 connected to control fluid inlet lines that provide fluid to the reactor vessel 100 and an output valve 103 connected to control fluid flow out of the reactor vessel 100 via an outlet fluid line. A device 105, which may be a sensor, such as a temperature sensor, a pressure sensor, a fluid level meter, etc. or some other equipment such as an electrical heater or a steam heater, is disposed in or near the reactor vessel 100. Similarly, Reactor_02 includes a reactor vessel 200, two input valves 201 and 202, an output valve 203 and a device 205. Likewise, Reactor_03 includes a reactor vessel 300, two input valves 301 and 302, an output valve 303 and a device 305. As illustrated in FIG. 1, the controllers 12 are communicatively coupled to the valves 101–103, 201–203 and 301–303 and to the devices 105, 205 and 305 via the bus 19 to control the operation of these elements to perform one or more operations with respect to the reactor units. Such operations may include, for example, filling the reactor vessels, heating the material within the reactor vessels, dumping the reactor vessels, cleaning the reactor vessels, etc.

The valves, sensors and other equipment illustrated in FIG. 1 may be any desired kind or type of equipment including, for example, Fieldbus devices, standard 4–20 mA devices, HART devices, etc. and may communicate with the controllers 12 using any known or desired communication protocol such as the Fieldbus protocol, the HART protocol, the 4–20 mA analog protocol, etc. Still further, other types of devices may be connected to and be controlled by the controllers 12. Also, other controllers may be connected to the controllers 12 and to the workstations 14 via the Ethernet communication link 15 to control other devices or areas associated with the process 16 and the operation of such additional controllers may be coordinated with the operation of the controllers 12 illustrated in FIG. 1 in any desired manner.

Generally speaking, the process control system 10 of FIG. 1 may be used to implement batch processes in which, for example, one of the workstations 14 or the controllers 12 executes a batch executive routine 40, which is a high-level control routine that directs the operation of one or more of the reactor units (as well as other equipment) to perform a series of different steps (commonly referred to as phases) needed to produce a product, such as a food product, a drug or other pharmaceutical product, etc. The steps or phases are typically implemented using software objects that can be downloaded to and instantiated and executed by one of more of the processors 21 and 24 within the system 10.

To implement different phases, the batch executive routine 40 uses what is commonly referred to as a recipe, which is a software object that specifies the steps to be performed, the amounts and times associated with the steps and the sequence of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine 40 will cause the controllers 12 to execute a different control algorithm for each one of these phases. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batch runs in the reactor units illustrated in FIG. 1, control routines may be used to control other desired devices to perform any other desired batch process runs or to perform continuous process runs, if desired.

At a high level, in a relevant portion of the operation, a person or entity at one of the workstations 14 may use the design software 17 to create or modify recipes or other software objects and the approval software 18 may electronically request approval from various authorizing entities such as, for example, production, engineering, quality assurance or management. The authorizing entities may use the workstations 14 or the terminals 32 to review the recipe and/or other software object(s), in question and approve or reject the recipe and/or other software object(s). The approval or rejection of the software objects in question may be communicated to the person or entity that requested approval of the objects or back to the approval. routine 18 which can track who has and who has not approved of the software object. Once a software object has been approved by all the entities from which approval was requested (or any pre-established subset defining a group of entities), the approval routine 18 may enable the software object to be downloaded to one of the controllers 12 or to the batch executive routine 40 for implementation or execution within the process control system 10.

Figure 2:
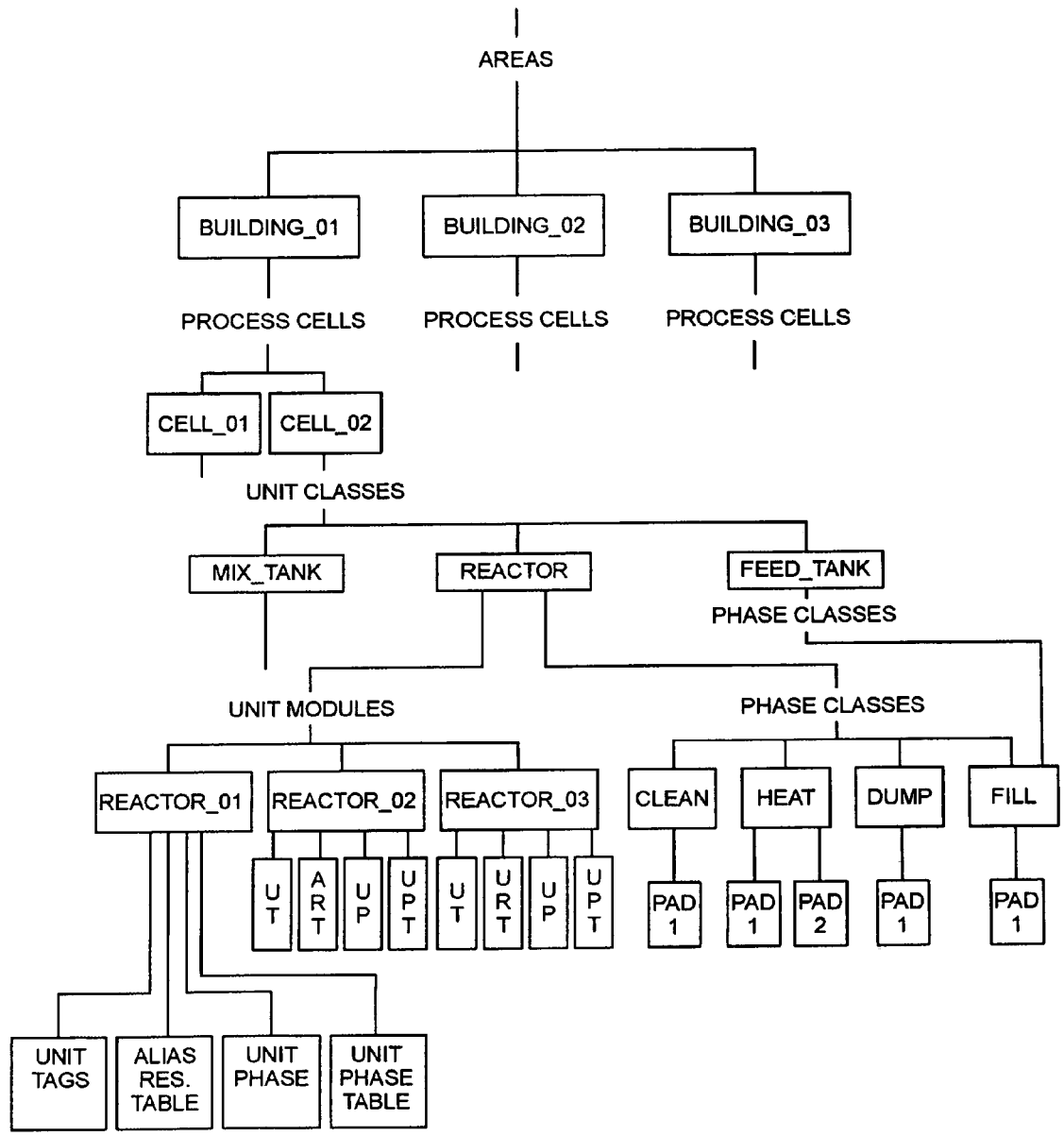
FIG. 2 is a block diagram of an object structure illustrating a typical logical hierarchy or configuration of the process control system of FIG. 1.

The object tree of FIG. 2 illustrates example software objects that may be created and downloaded with the design software 17 acting in conjunction with the approval software 18. The software objects of FIG. 2 are provided merely as examples of software objects (in addition to the recipes described above) that may be created and approved using the integrated electronic approval system described herein, it being understood that other software objects may be created and approved using this system as well. The software objects of FIG. 2, which are implemented using software routines, are illustrated with boxes while general categories of objects (or object types) are indicated above the objects in the tree with no box. As illustrated in FIG. 2, the process control system 10 includes one or more areas that may be, for example, buildings or other geographical area designations within a process control plant. In the object tree of FIG. 2, the process 16 has three area objects named Building_01, Building_02 and Building_03. Each area object may be divided into process cells, each of which corresponds to a different aspect of the process being performed in the area. The Building_01 area object of FIG. 2 is illustrated as including two process cell objects designated Cell_01 and Cell_02. Cell_01 may, for example, be related to making a component of a product used in Cell_02. Each cell object may include zero or more unit classes, which identify different categories or groupings of hardware used in the process cell. Generally speaking, a unit class is a named object that holds a common configuration of a set of related equipment and, more particularly, is a collection of units that have very similar, if not identical, process instrumentation, each of which performs a very similar, if not identical, function within a process. Unit class objects are typically named to describe the types of units within the process control system to which they belong. FIG. 2 includes a Mix_Tank unit class, a Reactor unit class and a Feed_Tank unit class. Of course, in most process control systems or networks, many other types of unit classes will be provided or defined including, for example, dryer units, feedheader units, and other individual or logical groupings of hardware.

As illustrated for the Reactor unit class of FIG. 2, each unit class object may have unit module objects and phase class objects associated therewith. Unit module objects generally specify certain instances of replicated hardware within the named unit class while phase classes generally specify the phases that can be applied to the unit modules associated with the unit class. More particularly, a unit module object is a named object that holds all of the variables and unit phases (defined hereinafter) for a single process unit and is typically named to identify specific process equipment. For example, the Reactor unit class of FIG. 2 has Reactor_01, Reactor_02 and Reactor_03 unit modules, which correspond to Reactor_01, Reactor_02 and Reactor_03 illustrated in FIG. 1, respectively. The Mix_Tank unit class and the Feed_Tank unit class will similarly have particular unit modules corresponding to particular hardware or equipment within the process 16. However, for the sake of simplicity, none of the equipment associated with the Mix_Tank or the Feed_Tank unit classes is illustrated in FIG. 1.

A phase class is a named object that holds the common configuration for a phase that can run on the multiple units belonging to the same unit class and on multiple different unit classes. In essence, each phase class is a different control routine (or phase) that is created and used by the controllers 12 to control unit modules within the same or different unit classes. Typically, each phase class is named in accordance with the verb that describes an action performed on a unit module. For example, as illustrated in FIG. 2, the Reactor unit class has a Fill phase class, which is used to fill any one of the reactor vessels 100, 200 or 300 of FIG. 1, a Heat phase class, which is used to heat any one of the reactor vessels 100, 200 or 300 of FIG. 1, a Dump phase class, which is used to empty any one of the reactor vessels 100, 200 or 300 of FIG. 1, and a Clean phase class, which is used to clean any one of the reactor vessels 100, 200 or 300 of FIG. 1. Of course, there can be any other phase classes associated with this or any other unit class. The Fill phase class is associated with both the Reactor unit class and the Feed_Tank unit class and, thus, can be used to perform fill functions on Reactor unit modules as well as Feed_Tank unit modules.

A phase class may generally be thought of as a software routine or object that may be called by the batch executive routine to perform some function needed in an overall batch process, as defined by the recipe for that batch process. A phase class may include zero or more phase input parameters, which are basically the inputs provided to the phase class software routine or object from the batch executive routine or another phase class; zero or more phase output parameters which are basically the outputs of the phase class routine passed back to the batch executive routine or to another phase class; zero or more phase messages, which may be messages to be displayed to the user regarding the operation of the phase class, information related to other phase classes with which the phase class is associated in some manner; and zero or more phase algorithm parameters, which cause parameters to be created in phase logic modules (PLMs) or unit phases based on this phase class. These phase algorithm parameters are used as temporary storage locations or variables during the execution of the phase and are not necessarily visible to the user or to the batch executive routine. The phase class includes one or more phase algorithm definitions (PADs) that, generally speaking, are the control routines used to implement the phase. Also, the phase class has a list of associations to zero, one, two or more unit classes, and this list defines the unit classes for which this phase class and, consequently, the PAD of the phase class, can be applied. The Fill phase class list of associations includes both the Reactor unit class and the Feed_Tank unit class.

Figure 3:
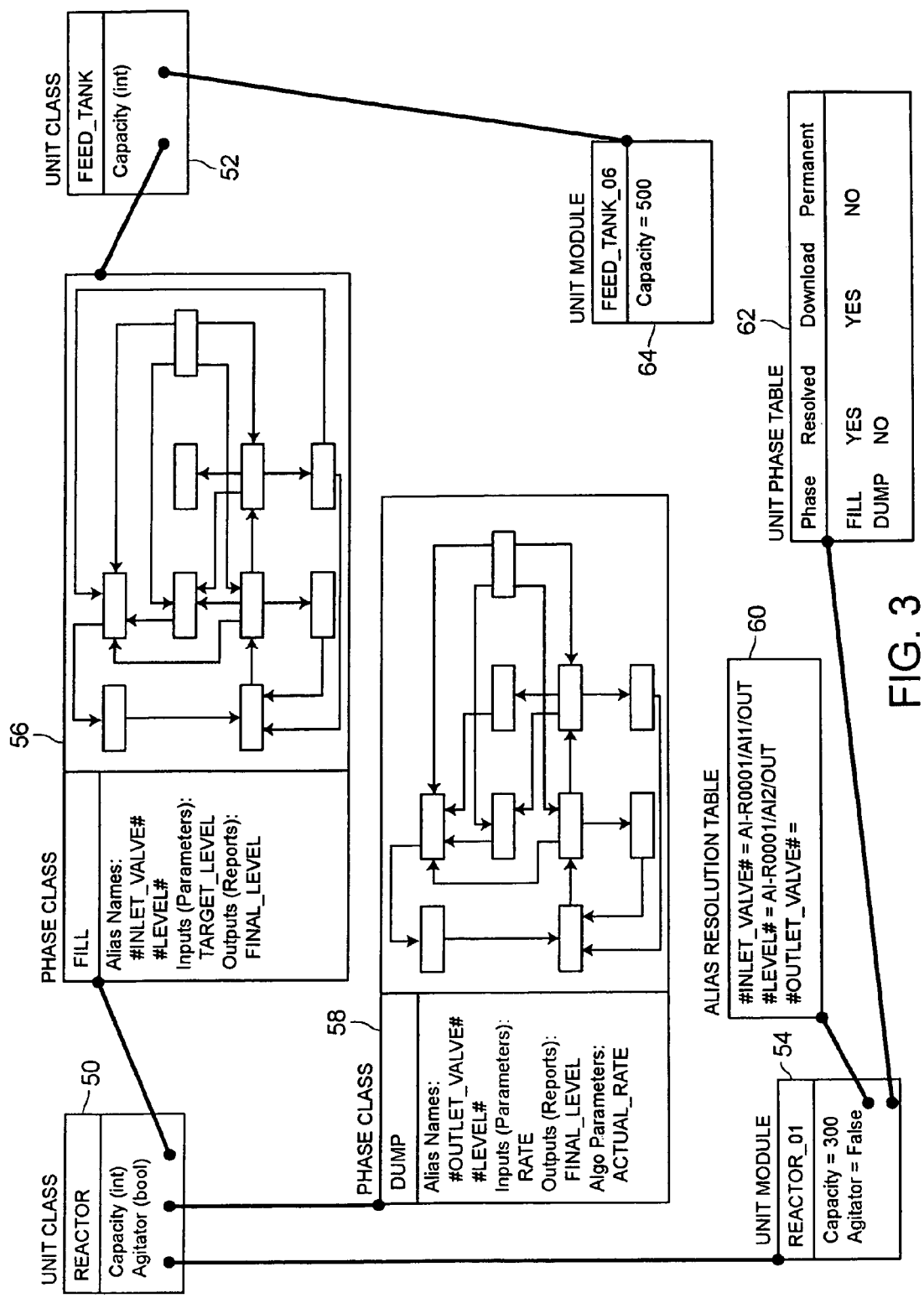
FIG. 3 is a more detailed block diagram illustrating a portion of the object structure of FIG. 2 in more detail.

FIG. 3 depicts a more detailed version of some of the objects illustrated in FIG. 2 and the interrelationships between these objects. Two unit classes are depicted in FIG. 3, namely, a Reactor unit class 50 and a Feed_Tank unit class 52. The Reactor unit class 50 has one unit module 54, namely Reactor_01. While others may exist, they are simply not illustrated in FIG. 3. The unit module 54 defines some of the reactor parameters associated with the Reactor unit class 50, namely, that the capacity of the Reactor_01 is 300 and that the Reactor_01 does not include an agitator. Likewise, two phase classes are associated with the Reactor unit class 50 including a Fill phase class 56 and a Dump phase class 58. The Fill phase class 56 includes a PAD (illustrated as an SFC in graphical form on the right side thereof) that has been designed using two alias names, namely, #INLET_VALVE# and #LEVEL#. These alias names are actually used in the boxes illustrated in the PAD of the Fill phase class 56 but may, alternatively, be used anywhere else within the logic of the PAD. The Fill phase class 56 also includes an input defined as TARGET_LEVEL and an output defined as FINAL_LEVEL. While the alias names are indicated as being delimited or marked by a number sign (#), any other identifier could be used to define an alias name that must be replaced upon instantiation of a phase. Similarly, the Dump phase class 58 includes a PAD, illustrated on the right hand side thereof in graphical form, having alias names of #OUTLET_VALVE# and #LEVEL#, an input defined as RATE, an output defined as FINAL_LEVEL and an algorithm parameter (used by the PAD) defined as ACTUAL_RATE, which may be used as a temporary storage location during execution of the PAD.

Figure 4:
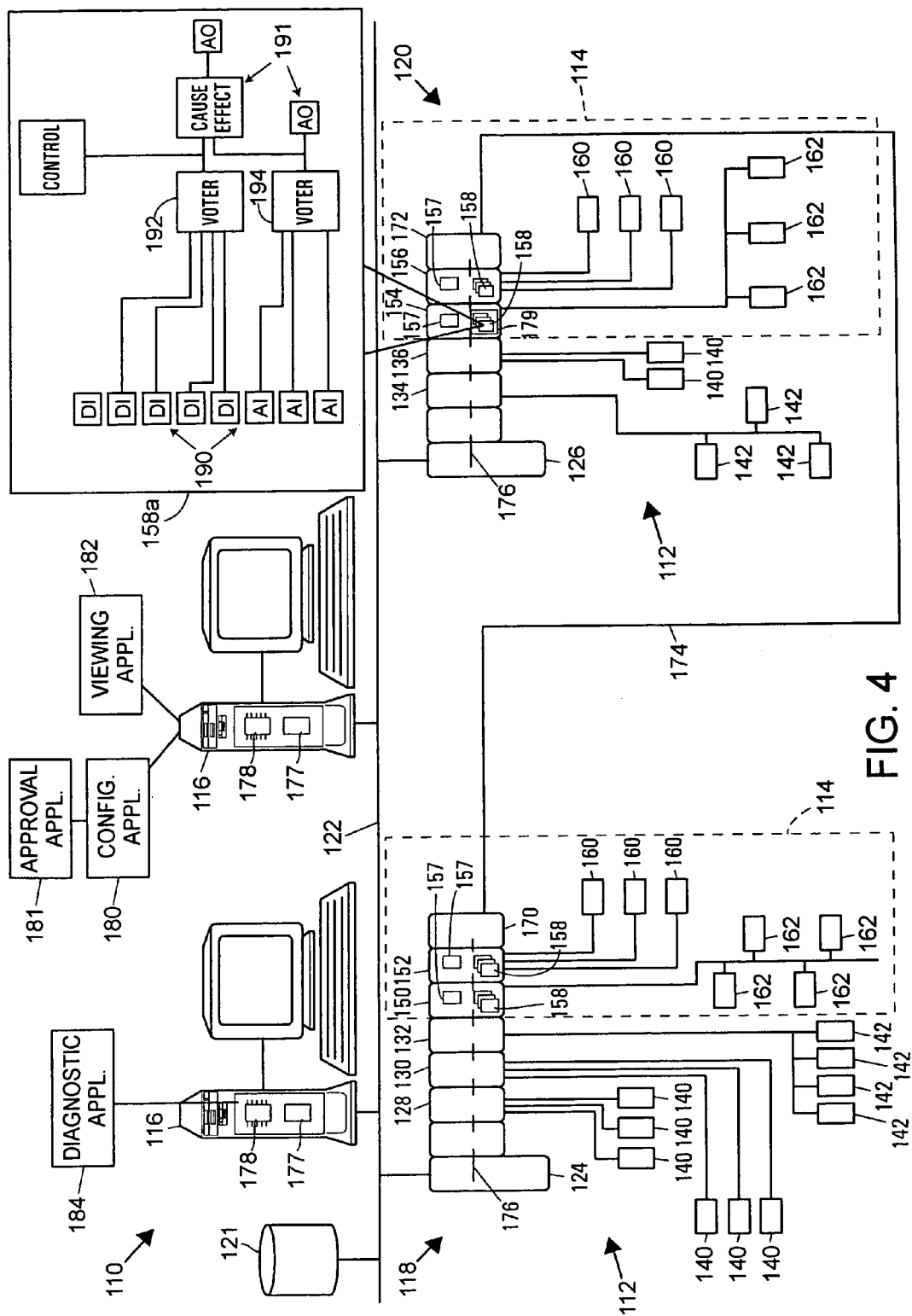
FIG. 4 is a block diagram of an exemplary process plant having a safety system that is integrated with a process control system, wherein the safety system includes an integrated electronic software object approval system therein.

While FIGS. 1–3 illustrate a process control system in which software objects may be created and used to perform traditional process control functions, FIG. 4 illustrates an integrated process control system and safety instrumented system that includes integrated design and approval software that may be used to create, change and approve the same or other software objects within either or both of the process control system and the safety instrumented system. In particular, as illustrated in FIG. 4, a process plant 110 includes a process control system 112 integrated with a safety system 114 (indicated by dotted lines), which generally operates as a Safety Instrumented System (SIS) that monitors and overrides the control provided by the process control system 112 to thereby maximize the likely safe operation of the process plant 110. The process plant 110 also includes one or more host workstations, computers or user interfaces 116 (which may be any type of personal computers, workstations, PDAs, etc.) which are accessible by plant personnel, such as process control operators, maintenance personnel, safety engineers, etc. In the example illustrated in FIG. 4, two user interfaces 116 are shown as being connected to two separate process control/safety control nodes 118 and 120 and to a configuration database 121 via a common communication line or bus 122. The communication network 122 may be implemented using any desired bus-based or non-bus based hardware, using any desired hardwired or wireless communication structure and using any desired or suitable communication protocol, such as an Ethernet protocol.

Generally speaking, each of the nodes 118 and 120 of the process plant 110 includes both process control system devices and safety system devices connected together via a bus structure that may be provided on a backplane into which the different devices are attached. The node 118 is illustrated in FIG. 4 as including a process controller 124 (which may be a redundant pair of controllers) as well as one or more process control system input/output (I/O) devices 128, 130 and 132 while the node 120 is illustrated as including a process controller 126 (which may be a redundant pair of controllers) as well as one or more process control system I/O devices 134 and 136. Each of the process control system I/O devices 128, 130, 132, 134 and 136 is communicatively connected to a set of process control related field devices, illustrated in FIG. 4 as field devices 140 and 142. The process controllers 124 and 126, the I/O devices 128–136 and the controller field devices 140 and 142 generally make up the process control system 112 of FIG. 4.

Likewise, the node 118 includes one or more safety system logic solvers 150, 152, while the node 120 includes safety system logic solvers 154 and 156. Each of the logic solvers 150–156 is an I/O device having a processor 157 that executes safety logic modules 158 stored in a memory 179 and is communicatively connected to provide control signals to and/or receive signals from safety system field devices 160 and 162. Additionally, each of the nodes 118 and 120 includes a message propagation device (MPD) 170 or 172, which are communicatively coupled to each other via a ring type bus connection 174 (only part of which is illustrated in FIG. 4). The safety system logic solvers 150–156, the safety system field devices 160 and 162, the MPDs 170 and 172 and the bus 174 generally make up the safety system 114 of FIG. 4.

The process controllers 124 and 126, which may be, by way of example only, DeltaV™ controllers sold by Emerson Process Management or any other desired type of process controllers, are programmed to provide process control functionality (using what are commonly referred to as control modules) using the I/O devices 128, 130 and 132 (for the controller 124), the I/O devices 134 and 136 (for the controller 126) and the field devices 140 and 142. In particular, each of the controllers 124 and 126 implements or oversees one or more process control routines (which are software objects and may be made up of a collection of interconnected software objects) stored therein or otherwise associated therewith and communicates with the field devices 140 and 142 and the workstations 114 to control the process 110 or a portion of the process 110 in any desired manner. The field devices 140 and 142 may be any desired types of field devices, such as sensors, valves, transmitters, positioners, etc., and may conform to any desired open, proprietary or other communication or programming protocol including, for example, the HART or the 4–20 ma protocol (as illustrated for the field devices 140), any fieldbus protocol such as the FOUNDATION® Fieldbus protocol (as illustrated for the field devices 142), or the CAN, Profibus, the AS-Interface protocols, to name but a few. Similarly, the I/O devices 128–136 may be any known types of process control I/O devices using any appropriate communication protocol(s).

The safety logic solvers 150–156 of FIG. 4 may be any desired type of safety system control devices that include a processor 157 and a memory that stores safety logic modules 158 adapted to be executed on the processor 157 to provide control functionality associated with the safety system 114 using the field devices 160 and 162. Of course, the safety field devices 160 and 162 may be any desired type of field devices conforming or using any known or desired communication protocol, such as those mentioned above. In particular, the field devices 160 and 162 may be safety-related field devices of the type that are conventionally controlled by a separete, dedicated safety-related control system. In the process plant 110 illustrated in FIG. 4, the safety field devices 160 are depicted as using a dedicated or point-to-point communication protocol, such as the HART or the 4–20 ma protocol, while the safety field devices 162 are illustrated as using a bus communication protocol, such as a Fieldbus protocol. The safety field devices 160 may perform any desired function, such as that of a shut-down valve, a shut-off switch, etc.

A common backplane 176 (indicated by a dashed line through the controllers 124, 126, the I/O devices 128–136, the safety logic solvers 150–156 and the MPDs 170 and 172) is used in each of the nodes 118 and 120 to connect the controllers 124 and 126 to the process control I/O cards 128, 130 and 132 or 134 and 136, as well as to the safety logic solvers 150, 152, 154 or 156 and to the MPDs 170 or 172. The controllers 124 and 126 are also communicatively coupled to, and operate as a bus arbitrator for the bus 122, to enable each of the I/O devices 128–136, the logic solvers 150–156 and the MPDs 170 and 172 to communicate with any of the workstations 116 via the bus 122.

As will be understood, each of the workstations 116 includes a processor 177 and a memory 178 and at least one of the workstations stores one or more configuration, approval, diagnostic and/or viewing applications adapted to be executed on the processor 178. A configuration application 180, an approval application (or routine) 181 and a viewing application 182 are illustrated in an exploded view in FIG. 4 as being stored in one of the workstations 116 while a diagnostic application 184 is illustrated as being stored in the other one of the workstations 116. However, if desired, these and other applications could be stored and executed in different ones of the workstations 116 or in other computers associated with the process plant 110. Generally speaking, the configuration application 180 provides configuration information to a safety engineer and enables the safety engineer to configure (design) some or all elements of the process plant 110 and to store that configuration in the configuration database 121. As part of the configuration activities performed by the configuration application 180, the safety engineer may create or change control routines or control modules (i.e., software objects) for the process controllers 124 and 126, may create safety logic software modules 158 for any and all of the safety logic solvers 150–156 (including creating and programming input, voter and other function blocks for use in the safety logic solvers 150–156 or even in the controllers 124 and 126) and may download these different control and safety modules, after appropriate authorization to do so has been received via the approval routine 181, to the appropriate ones of the process controllers 124 and 126 and the safety logic solvers 150–156 via the bus 122 and controllers 124 and 126. Similarly, the configuration application 180 may be used to create and download other programs and logic, after appropriate authorization has been received to do so via the approval routine 181, to the I/O devices 128–136, any of the field devices 140, 142, 160 and 162, etc. If desired, a separate set of configuration and approval routines may exist for each of the process control system 112 and the safety system 114 to thereby isolate the design activities of these systems from one another.

The viewing application 182 may be used to provide one or more displays to a user, such as to a process control operator, a safety operator, etc., which includes information about the state of the process control system 112 and the safety system 114 either in separate views or in the same view, if so desired. For example, the viewing application 182 may be an alarm display application that receives and displays indications of alarms to an operator. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network," both of which are assigned to the assignee of this patent and are hereby expressly incorporated by reference herein. It will be understood, however, that the alarm display or alarm banner of these patents may receive and display alarms from both the process control system 112 and the safety system 114 in an integrated alarm display as the alarms from both systems 112 and 114 will be sent to the operator workstation 114 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 124, 126 within the safety system 114 using communications over the bus 122 and the backplane 176 to take the corresponding action with respect to the safety alarm. In a similar manner, other viewing applications may display information or data from both the process control system 112 and the safety system 114 as these systems may use the same types and kinds of parameters, security and referencing so that any data from one of the systems 112 and 114 can be integrated into a display or view traditionally provided for a process control system. Likewise, changes to or new ones of these viewing applications (which are software modules) may be created and implemented after appropriate authorization has been received via the electronic signature process described in more detail herein.

In any event, the applications 180, 181, 182 and 184, as well as any other applications may send separate configuration and other signals to and may receive data from each of the process controllers 124 and 126 as well as from each of the safety system logic solvers 150–156. These signals may include process control related messages related to controlling the operational parameters of the process field devices 140 and 142, and may include safety-level messages related to controlling the operational parameters of the safety-related field devices 160 and 162. While the safety logic solvers 150–156 may be programmed to recognize both the process control messages and the safety messages, the safety logic solvers 150–156 are capable of distinguishing between the two types of messages and will not be capable of being programmed or effected by process control related configuration signals. In one example, the programming messages sent to the process control system devices may include certain fields or addresses which are recognized by the safety system devices and which prevent those signals from being used to program the safety system devices.

If desired, the safety logic solvers 150–156 may use the same or a different hardware or software design as compared to the hardware and software design used for the process control I/O cards 128–136. The use of alternate technologies for the devices within the process control system 112 and devices within the safety system 114 may minimize or eliminate common cause hardware or software failures. Furthermore, the safety system devices, including the logic solvers 150–156 may use any desired isolation and security techniques to reduce or eliminate the chances of unauthorized changes being made to the safety-related functions implemented thereby. For example, the safety logic solvers 150–156 and the configuration application 180 may require a person with a particular authority level or a person located at a particular workstation to make changes to the safety modules within the logic solvers 150–156, with this authority level or location being different from the authority or access level or location needed to make changes to the process control functions performed by the controllers 124 and 126 and the I/O devices 128–136. In this case, only those persons designated within the safety software or located at workstations authorized to make changes to the safety system 114 have authorization to alter safety-related functions, which minimizes the chances of corruption to the operation of the safety system 114. As will be understood, to implement such security, the processors within the safety logic solvers 150–156 assess the incoming messages for proper form and security and operate as gatekeepers on changes being made to the safety control modules 158 executed within the safety logic solvers 150∝156.

In a similar manner, the approval routine 181 illustrated in FIG. 4 may be implemented to prevent changes from being made to software objects within either or both of the process control system 112 and the safety system 114 without the proper authorization from other individuals (either by name or by job position) from which this authorization is required. In particular, the approval routine 181 may detect changes being made to software modules within the configuration, display, or viewing applications and prevent the downloading of these modules to the process control system 112 or to the safety system 114 without the appropriate authorization or approval from those needed to do so.

The use of the backplane 176 in each of the nodes 118 and 120 enables the safety logic solvers 150 and 152 and the safety logic solvers 154 and 156 to communicate locally with one another to coordinate safety functions implemented by each of these devices, to communicate data to one another, or to perform other integrated functions. On the other hand, the MPDs 170 and 172 operate to enable portions of the safety system 114 that are disposed at vastly different locations of the plant 110 to still communicate with one another to provide coordinated safety operation at different nodes of the process plant 110. In particular, the MPDs 170 and 172 in conjunction with the bus 174 enable the safety logic solvers associated with different nodes 118 and 120 of the process plant 110 to be communicatively cascaded together to allow for the cascading of safety-related functions within the process plant 110 according to an assigned priority. Alternatively, two or more safety-related functions at different locations within the process plant 110 may be interlocked or interconnected without having to run a dedicated line to individual safety field devices within the separate areas or nodes of the plant 110. In other words, the use of the MPDs 170 and 172 and the bus 174 enables a safety engineer to design and configure a safety system 114 that is distributed in nature throughout the process plant 110 but that has different components thereof communicatively interconnected to enable the disparate safety related hardware to communicate with each other as required. This feature also provides scalability of the safety system 114 in that it enables additional safety logic solvers to be added to the safety system 114 as they are needed or as new process control nodes are added to the process plant 110.

In one embodiment, the logic solvers 150–156 may be programmed to perform control activities with respect to the safety devices 160 and 162, using a function block programming paradigm. In particular, as illustrated in an expanded view of one of the safety control modules 158*a* (stored in the memory 179) of the logic solver 154, a safety control module may include a set of communicatively interconnected function blocks (each of which is a software object) that can be created and downloaded to the logic solver 154 for implementation during operation of the process 110. As illustrated in FIG. 4, the control module 158*a* includes two voter function blocks 192 and 194 having inputs communicatively interconnected with other function blocks 190, which may be, for example, analog input (AI), digital input (DI) function blocks, or other function blocks designed to provide signals to the voter function blocks 192. The voter function blocks 192 and 194 have at least one output connected to one or more other function blocks 191 which may be analog output (AO), digital output (DO), cause and effect function blocks which implement cause and effect logic, control and diagnostic function blocks which may receive output signals from the voter function blocks 192 and 194 to control the operation of the safety devices 160 and 162, etc. Of course, the safety control module 158*a* may be programmed in any desired manner to include any types of function blocks configured in any desired or useful manner to perform any desired functionality. Additionally or alternatively, other input function blocks, such as AI and DI function blocks may be coupled directly to safety system logic for providing a safety logic control module that responds to events detected by the AI or DI blocks by activating one or more shut-down devices upon the occurrence of one or more such events. As will be understood, the control module 158*a* and each of the function blocks therein are separate software objects which may be downloaded to the safety system 112 and which may be changed during operation, if so needed. However, before these creation or modification activities may be implemented these software objects may need to receive authorization via the approval routine 181, which will be described in more detail below.

In particular, the approval routine 181 is integrated with or communicatively tied to the configuration application 180 (or other design applications used within the process plant) to assure that the appropriate authority or review takes place for each new or modified software object that is created or changed, before that software object is actually downloaded to or otherwise implemented within the process control system 112 or the safety system 114 in an on-line manner.

As will be understood, the software object approval routine 181 is tightly integrated with the safety instrumented system (or the process control system) and, as a result, the approval routine 181 may utilize the safety instrumented system's security. Still further, because the approval routine 181 is in the same environment as the process control or safety system design or configuration software 180, reviewers may use the same tools to review the software object being approved as were used to develop it. As such, there are no issues with respect to the accuracy of the software object being reviewed. Furthermore, the approval routine 181 prevents software objects that require approval from being downloaded to the control or safety environment until all of the required approvals are in place. As such, the process control or the safety instrumented system is able to guarantee that only approved software objects are executed. However, if desired, the approval routine 181 may include (e.g., store) a security key that provides the ability for users who have this key to override the enforcement of this requirement and download an unapproved software object.

During operation, the approval routine 181 may detect changes being made to software objects and may cause any modifications that are made to an approved software object to result in the version number of the software object being incremented. Furthermore, when the version number of the software object is incremented, the state of the software object is automatically changed by the approval routine 181 to an unapproved state. As a result, the new version of the software object cannot be downloaded or otherwise implemented in the process control system until all approvals have been re-executed on this new version of the software object.

Additionally, the approval routine 181 may log all approvals and/or rejections of a particular software object into a configuration audit trail associated with the software object. As a result of these features, the validation of the software object occurs as an integral part of the process control or the safety instrumented system validation.

Figure 5A:
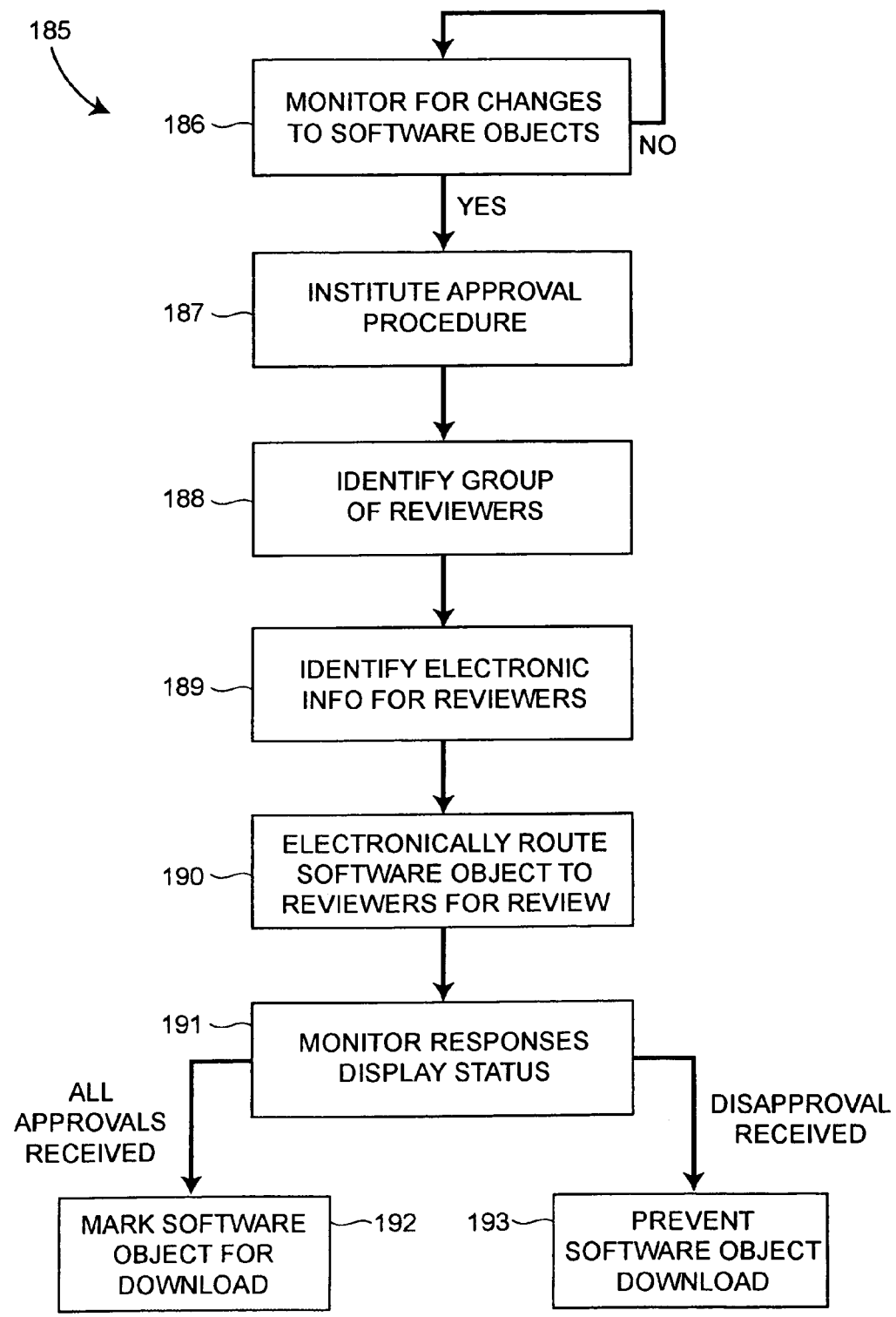
FIGS. 5A and 5B are exemplary flow diagrams of an approval routine.

FIG. 5A. illustrates a flowchart 185 showing steps that may be implemented by the approval routine 181 using the same or different software routines to provide approval functions within the process control and/or safety system. At a block 186 the approval routine 181 monitors the software design application (e.g., the configuration routine 180) or the configuration database to determine when and if a change is being made to any software objects. The block (or routine) 186 may determine that a change is being made to a software object by detecting alterations of an existing software object, the creation of a new software object, or even by receiving a request for the implementation of the approval process by, for example, a software object designer. Of course, the block 186 may wait to implement the approval process until all changes have been made to the software object as indicated by, for example, the software designer selecting a button in the design application indicating that the changes are complete. In any event, when or sometime after the block 186 detects a change made to a software object, a block 187 may automatically, or at the prompting of a designer, institute an approval procedure.

During the approval procedure, a block 188 (within, for example, the approval routine 181) may determine a group of entities (which may include one or more persons) and, as part of this process, may determine the number and types (such as job position) of signatures required for the approval based on information provided by a user or otherwise provided during configuration of the process control or the safety system. In one embodiment, the block 188 may use the risk reduction factor (RRF) entered by a user or configuration engineer (such as the safety system configuration engineer) to determine the types and numbers of approvals needed. In this case, the user may enter the desired RRF to be achieved for a particular function or software object and the block 188 uses this RRF to determine the required SIL level. The block 188 may then, using for example a look-up table, use the SIL level to determine the nature of signatures required (e.g., the number of signatures, whether the signatures must come from the same or from different departments, the level or type of the job or position held by the reviewer, etc.) It should be noted that each particular safety instrumented function has a SIL associated therewith and, thus, a particular SIL is specific to a safety instrumented function and may change from safety function to safety function.

In any event, a block 189 next determines the actual persons to whom to actually route the software object for approval. If desired, the names, electronic addresses or other electronic contact information for the reviewers within the selected group may be obtained from a corresponding look-up table. Additionally or alternatively, the group of reviewers and the associated electronic contact information may obtained from the configuration engineer directly, from the person making the change to the software object or from any other appropriate person via a display terminal. As part of this process, the block 189 may assess a stored list of possible names or offices (and associated electronic addresses, etc.) and select from that list in any desired or predetermined manner, either with or without the aid of the software object designer. Alternatively, the block 189 may prompt some oversight person via a user interface to select the particular person(s) matching the required levels and departments for the approval process.

After selecting the actual reviewers, a block 190 then electronically routes the created or modified software object to the selected reviewers and waits for the messages back from the reviewers as to whether the created or modified software object is approved or not. A block 191 may monitor responses from the reviewers to determine when (and if) all of the approvals have received, and, if all the reviewers (or a predetermined number of reviewers) approve the modified software object, a block 192 may mark the software object as capable of being downloaded. However, if responses from all of the reviewers have not been received, or if one of the reviewers has rejected the software object, the approval routine 181 will not mark the software object for downloading, thereby preventing that software object from being used in the process control or the safety system.

Of course, the approval routine 181 may loop until all responses have been received and provide the responses to the designer or user in any desired manner. If the block 191 determines that a particular number of rejections are received, the block 193 may mark the software object as requiring modification or re-submittal to the approvers to thereby enable the software object to be downloaded.

Of course, any or each of the blocks in the approval routine 181 may log the changes to the software object, the collection of approvals and rejections associated with the software object and any other information about the approval process in the configuration database or the audit trail associated with the software object. Still further, the approval routine 185 may track and, if desired, display to the designer (or even to the other reviewers) information pertaining to the state of the reviewing process, such as the identity of the reviewers, which of the reviewers has responded, which have accepted and/or which have rejected the new or modified software module, etc. If desired, the block 191 may send reminders to reviewers that have not responded.

In addition, once a software module is approved, the approval routine 185 may use the RRF in an on-line manner, i.e., during operation of the process control or the safety system in which the software object resides, to determine whether the safety function or operation associated with the software object is still meeting its design criteria. In particular, a configurer may determine which element of the safety function needs to be tested periodically, what the test period should be and how this testing impacts the overall RRF for the safety function. These details are typically determined at design time and thus are known to the configurer when implementing the function.

Figure 5B:
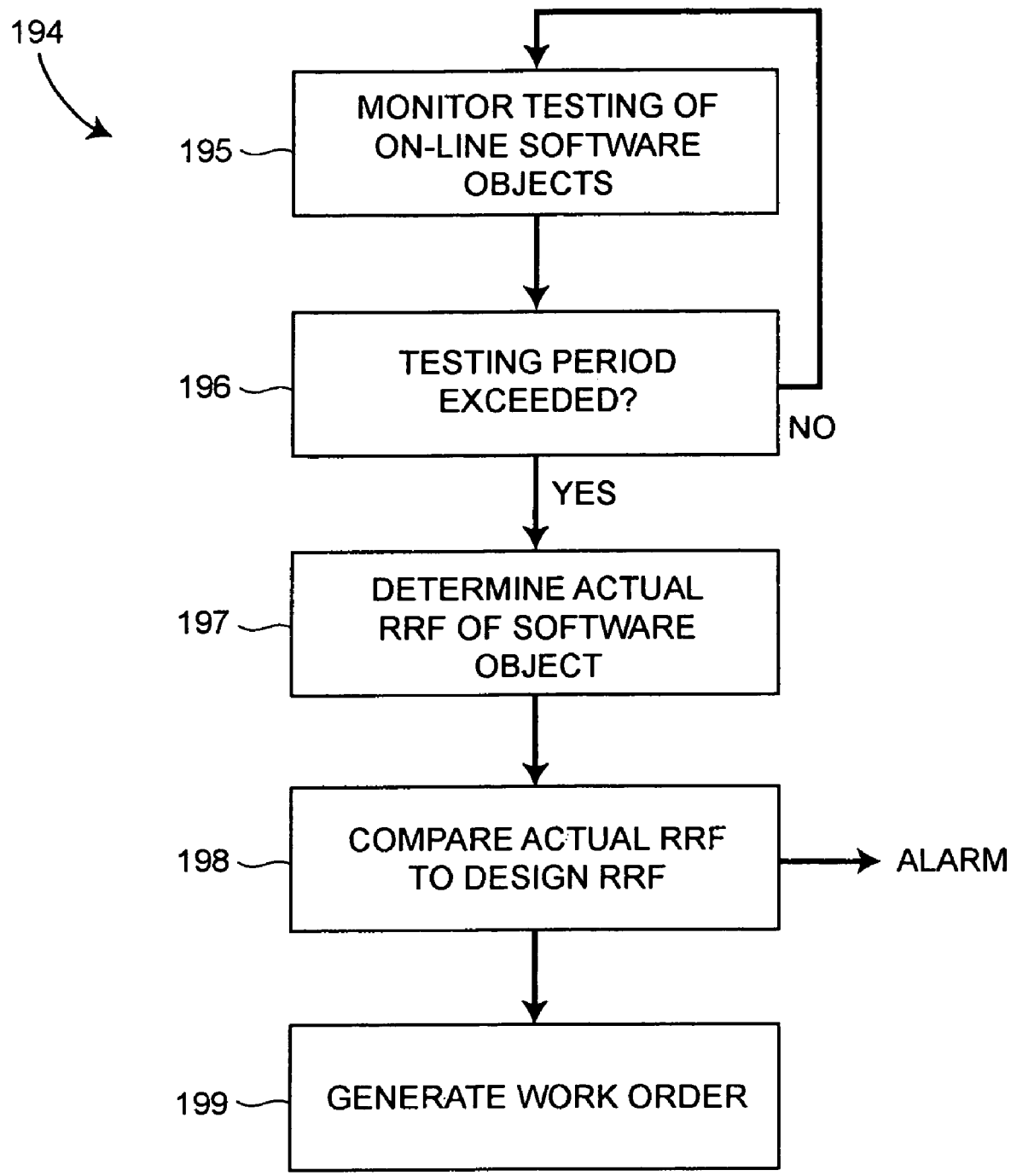

As illustrated in FIG. 5B, an on-line monitoring portion 194 of the approval routine includes a block 195 that monitors the testing of the elements. If the periodic test interval for a specific software object is exceeded, as determined by a block 196, a block 197 determines the actual RRF that is being achieved (based on the failure to perform the safety function test) and displays this modified RRF to a user, such as a safety system monitor or operator. A block 198 may also compare this modified RRF to the target RRF and generate an alarm when the target RRF is no longer being met. If desired, a block 199 may use the information in the SIL to automatically generate a work order (specifying, for example, a test to be run) prior to the test interval or after the test interval has been exceeded so as to maintain the RRF at or above its design target value or to return the RRF to its design level as quickly as possible.

It will be understood that, while a single approval routine 18 is illustrated in FIG. 1 and a single approval routine 181 is illustrated in FIG. 4, components of these routines may be stored in other computers or workstations so that the reviewers may be located at different workstations than the designer. In this case, similar or complementary software would be installed in each of a set of reviewer terminals (such as the reviewer terminals 32 illustrated in FIG. 1) communicatively connected to design terminal to enable the reviewers to receive approval messages from the routine 18 or 181 at the design terminal, to invoke software in the process control or safety system for analyzing the software object to be reviewed and for responding with an approval or a rejection and any comments that the reviewer might want to make.

Still further, as discussed in more detail below, the approval routines 18 or 181 may have any number of components that perform different functions, such as selecting reviewers, modifying software objects, etc. While some of these components will be discussed in more detail in conjunction with FIGS. 6–20, it will be understood that other routines could be associated with the approval or design routines instead or in addition. Furthermore, while a number of subroutines are discussed in FIGS. 6–20 with respect to the approval of a recipe used in a process control system, it will be understood that these routines could be used for approving other software objects as well, such as software objects in a safety system.

Figure 6:
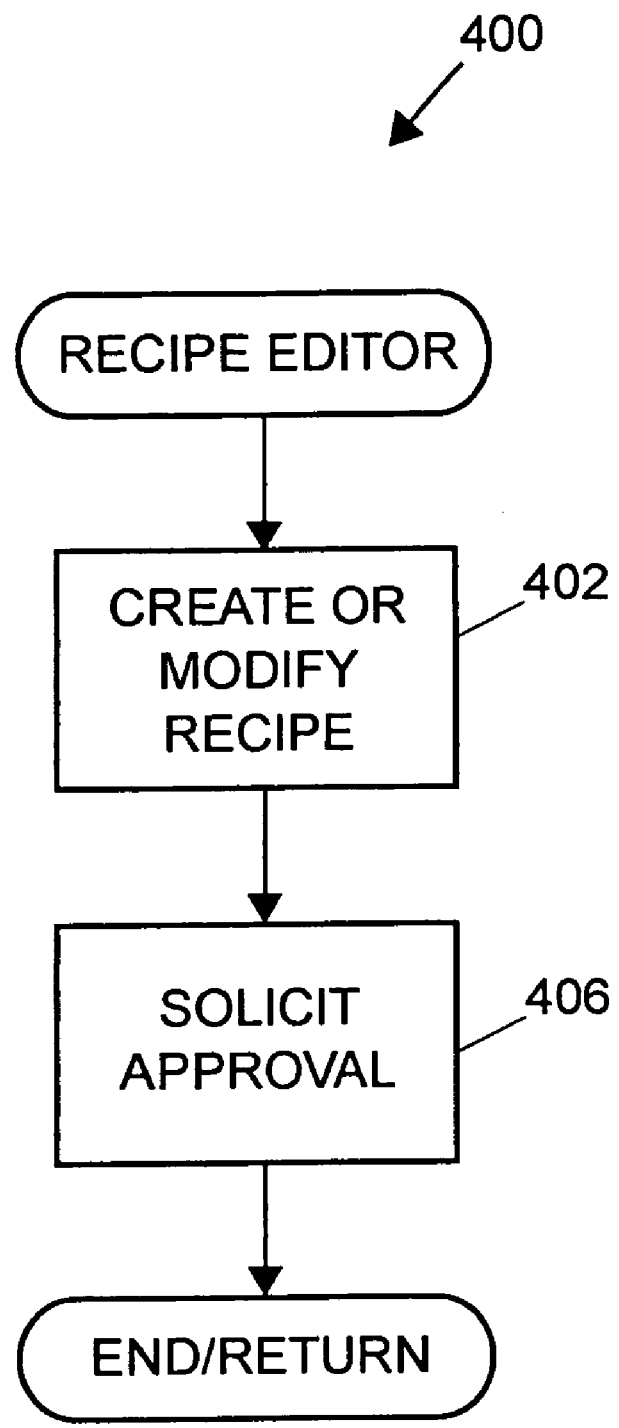
FIG. 6 is an exemplary flow diagram of a software object editor routine.

Turning now to FIG. 6, a recipe editor routine 400, which may be executed by one or more of the processors 21 of the workstations 14, begins execution at block 402, at which a user or operator creates or modifies a recipe, which may include modification of the software objects associated therewith, for use in the process control system 10. As will be readily appreciated, a user may create or modify recipes or other software objects using techniques described in conjunction with FIGS. 1–5 or using any other suitable techniques. After the recipe has been created or suitably modified, control passes from block 402 to block 406. As discussed in greater detail below in connection with FIGS. 7–13, an authorization setup routine 404 (FIG. 7) may be executed at least once prior to execution of the recipe editor routine 400, or any other time prior to the modification and/or downloading of a recipe or other software objects to the system 10. In general, authorization setup may include, but is not limited to, specifying persons or entities (e.g., signers) from which approval is needed to implement a recipe or other software object, or deleting or modifying signers.

At block 406, approval is solicited from each of the signers specified during the authorization setup for approving the recipe created or modified at block 402. Approval solicitation may include, but is not limited to, sending electronic mail to the signers that are specified to review the recipe in connection with the authorization setup routine 404, running a report that indicates approval status for each of the specified signers, sending an instant message to the signers that are to review the recipe or sending notification to the signers via any other suitable communication method. After approval has been solicited from each signer at block 406, the recipe editor routine 400 ends execution or returns control to another routine that called the recipe editor routine 400.

Figure 7:
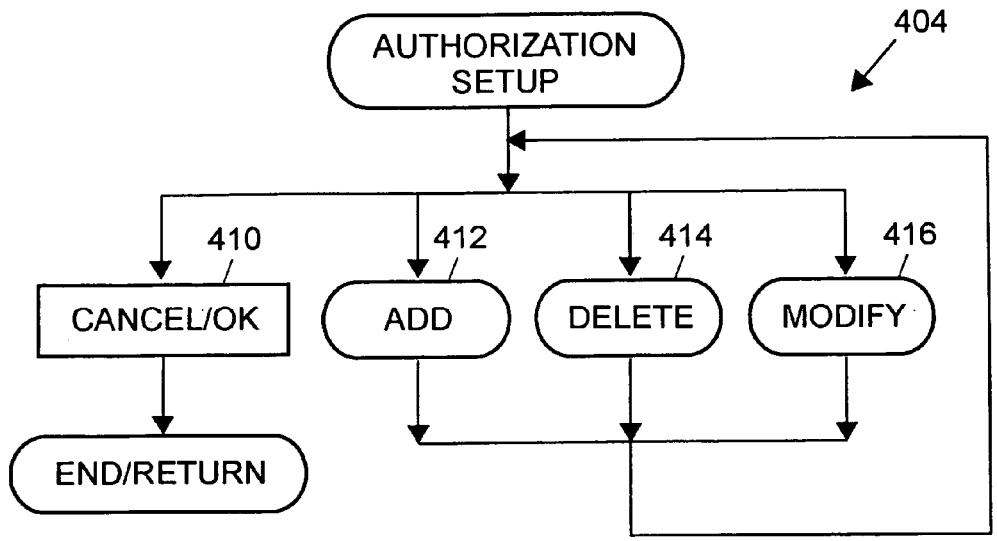
FIG. 7 is an exemplary flow diagram of an authorization setup routine.
Figure 8:
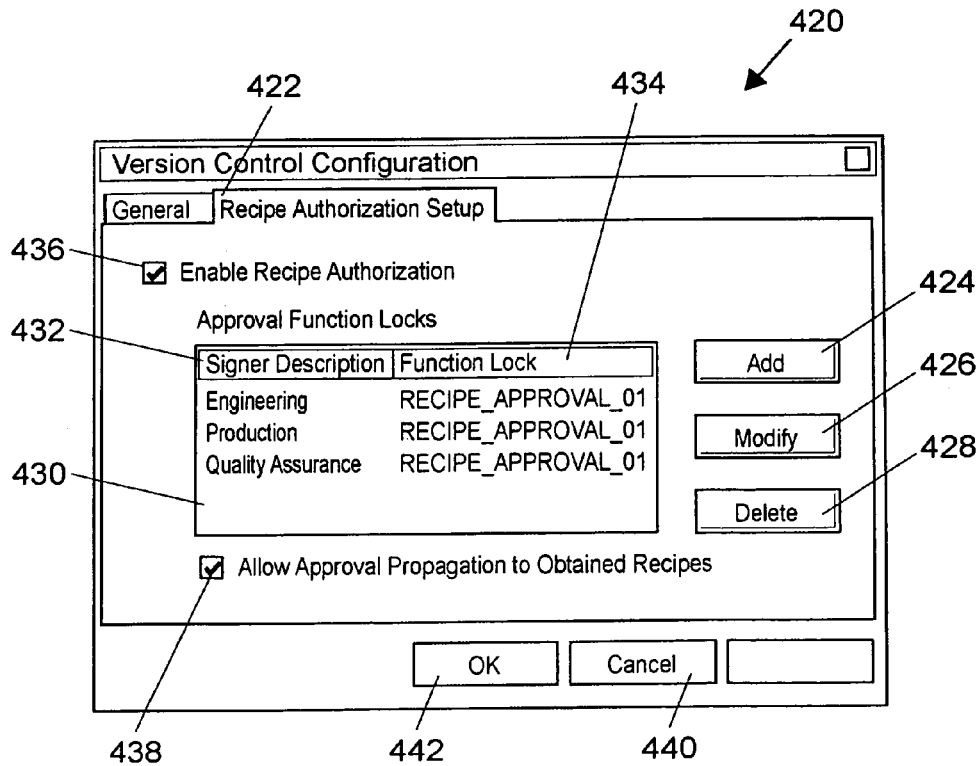
FIG. 8 is an exemplary user interface associated with the authorization setup routine of FIG. 7.

Further detail of the authorization setup routine 404 is provided in conjunction with FIGS. 7 and 8, which respectively disclose a flow diagram and a user interface screen for the authorization setup routine 404. While the authorization setup routine 404 is typically executed once at system startup, the authorization setup routine 404 could, instead, be executed more than once if desired. In general, as shown in FIG. 7, once the authorization setup routine 404 has been executed, a user may opt to cancel execution of the routine at cancel/ok block 410. Alternatively, the user may opt to add, delete or modify recipe signers at blocks 412, 414 or 416, respectively. After addition, deletion or modification of signers, control passes from blocks 412, 414 or 416 and enables a user to select to cancel or end operation of the authorization setup routine 404 at the block 410 or to again add, delete or modify signers using blocks 412–416. If the user opts to cancel or end the authorization setup routine 404 operation at block 410, the authorization setup routine 404 ends.

A user interface 420, as shown in FIG. 8, includes a recipe authorization setup tab 422, which allows a user to select interface buttons 424, 426 or 428 to add, modify or delete signers. The add, modify and delete interface buttons 424–428 correspond to (and may be selected to invoke the functions performed by) the add, delete and modify blocks 412–416 shown in FIG. 7. Further details on each of the blocks 412–416 and, by implication, the interface buttons 424–428 are provided in conjunction with FIGS. 9–13. As signers are added, modified or deleted, the status of the signers is shown in a text box 430. As illustrated in FIG. 8, the text box 430 includes a signer description column 432 that lists the names of the signers, which may be the names of persons or entities, and also includes a function lock column 434 listing the function locks that corresponding signers are required to have, thereby controlling access to an approval. For example, as shown in FIG. 8, the recipe is to be reviewed and signed off on by engineering, production and quality assurance, which correspond to function locks of RECIPE_APPROVAL_01.

Also shown in FIG. 8 are two check boxes 436 and 438, which correspond to enable recipe authorization and allow approval propagation to contained recipes (i.e., sub-recipes). In operation, when the check box 436 is checked, the enable recipe authorization features of the system are enabled and the authorization setup process is enabled. The checkbox 438, when unchecked, indicates that the user will not have the option to propagate approvals. Conversely, if the checkbox 438 is checked, the user will have the option of propagating approvals for sub-recipes. For example, a main recipe may be composed of or may contain two or more sub-recipes to which an approval associated with the main recipe may be automatically propagated. Of course, such automatic propagation of approvals for recipes may result in a significant time savings, particularly for recipes that include a large number of sub-recipes.

The user interface 420 also includes cancel and ok interface buttons, which are denoted by reference numerals 440 and 442, respectively. The interface buttons 440 and 442 correspond to the cancel/ok block 410 of FIG. 7 and allow a user to exit the authorization setup routine 404. While both interface buttons 440 and 442 enable a user to exit the authorization setup routine 404, the cancel interface button 440 ends the authorization setup routine 404 without including the changes made to the recipe authorization setup. Conversely, the ok interface button 442 allows the user to exit the authorization setup routine 404 and preserves the changes made to the authorization setup while using the user interface 420.

Figure 9:
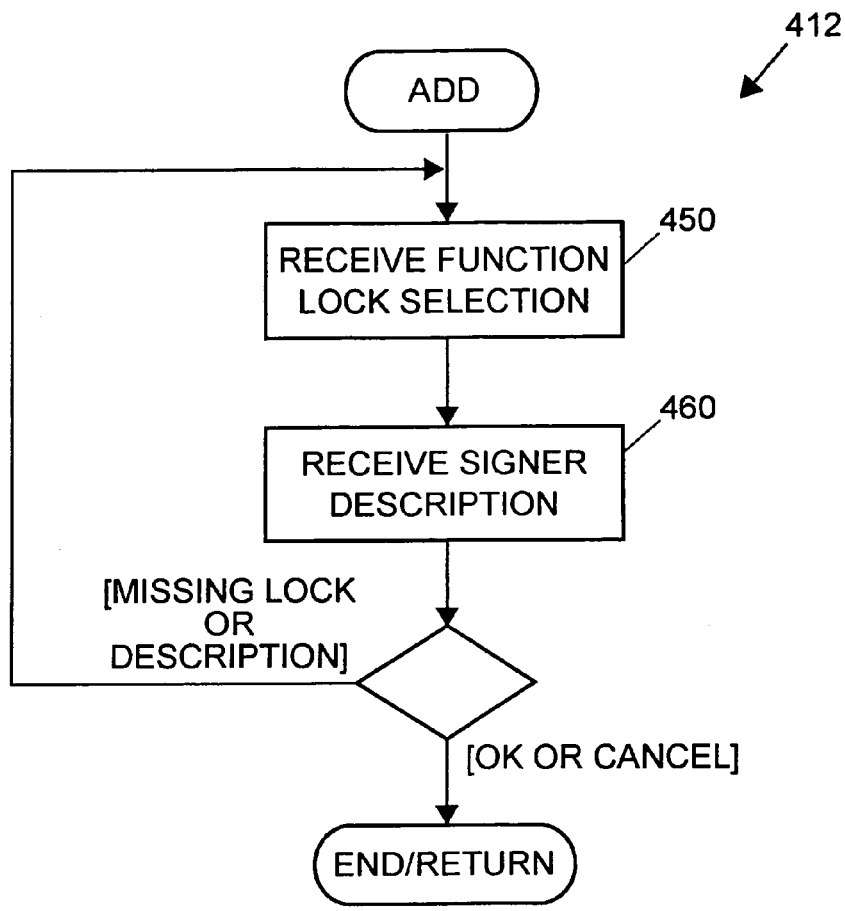
FIG. 9 is an exemplary flow diagram of an add routine.
Figure 10:
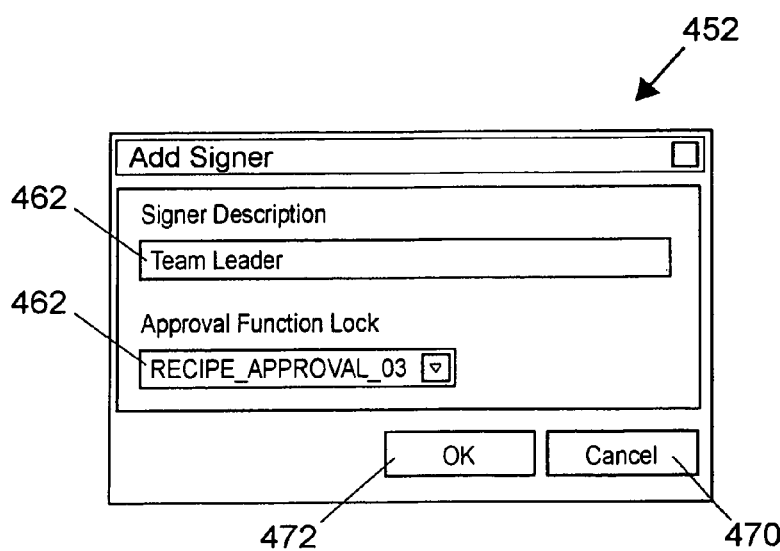
FIG. 10 is an exemplary user interface associated with the add routine of FIG. 9.

Turning now to FIG. 9, further details of the block 412, which represents an add routine, are provided. The add routine 412 begins execution at block 450, which receives the function lock selection provided by the user. As shown in FIG. 10, a graphical user interface or popup window 452 may include an approval function lock box 454 into which a user may input the name of the approval function lock. For example, as shown in FIG. 10, the box 454 may include an indication that the selection approval function lock is RECIPE_APPROVAL_03.

Returning to FIG. 9, after block 450 has received the function lock selection, block 460 receives a signer description provided by the user. For example, as shown in the user interface 452 of FIG. 10, the user may input a signer description in a block 462. By way of example, the description "Team Leader" is shown in block 462, which indicates that the user desires to add team leader as a signer having an approval function lock of RECIPE_APPROVAL_03.

After the function lock selection and the signer description have been received at blocks 450 and 460, respectively, control passes to block 466, which determines if either of the function lock or signer description is missing or if cancel or ok interface buttons, shown in FIG. 10 at reference numerals 470 and 472 respectively, have been selected. If the lock or description is missing, control passes from block 466 to block 450. Alternatively, if block 466 determines that the cancel or ok interface buttons 470 and 472 have been selected by the user, the add routine 412 ends its execution and returns control to the authorization setup routine 404 of FIG. 7. As described with respect to the user interface 420 of FIG. 8, actuation of the cancel interface button 470 causes the add routine 412 to end its execution without saving changes made during the execution thereof. Conversely, as previously noted, actuation of the ok interface button 472 causes the add routine 412 to end and save changes made during the execution of the add routine 412. If a new approver or signer is added by the add routine 412, any previously approved recipes (i.e., recipes for which all originally required approvals have been received) automatically become unauthorized until approval from the newly added signer is obtained.

Figure 11:
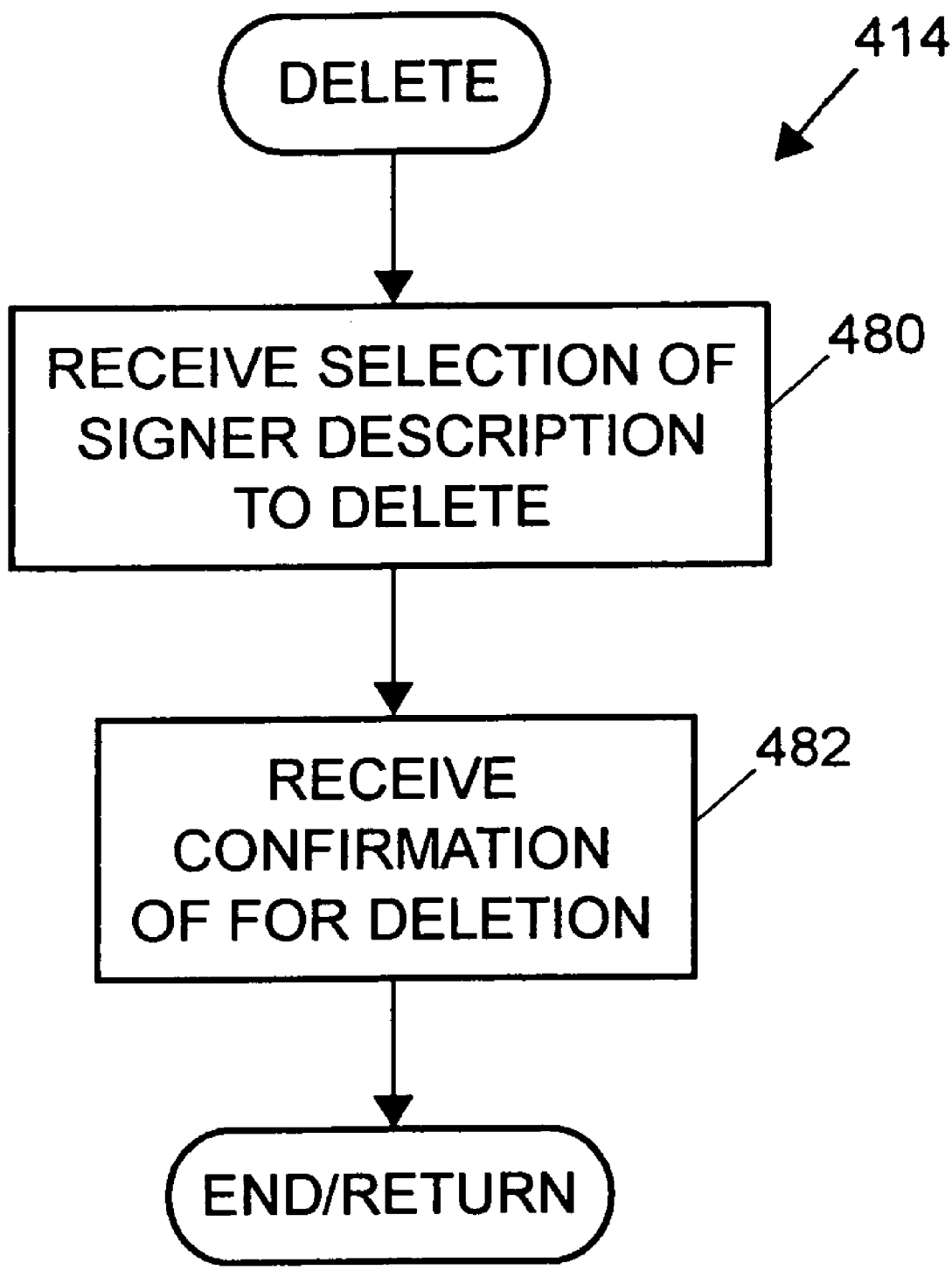
FIG. 11 is an exemplary flow diagram of a delete routine.

Further detail of the delete routine 414 is provided in connection with FIG. 11, which operates in connection with the user interface 420 of FIG. 8. In particular, the delete routine 414 begins execution at block 480, which receives the selection of the signer description to be deleted. The user may provide such a selection by selecting a signer description shown in the text box 430 of the user interface 420 of FIG. 8. After the user selects the description to be deleted, the user then actuates the delete interface button 428 to declare his or her intention to delete the selected signer description or signer. After block 480 completes execution, control passes to block 482, which receives confirmation for the deletion requested by the user. For example, after a user selects the signer description to be deleted and actuates the delete interface button 428, the delete routine 414 may request the user to confirm his or her desire to delete the selected signer description via a user interface graphic presented to the user on a display screen. Such a graphic may include ok or cancel interface buttons, wherein the actuation (e.g., selection via a mouse, keyboard, etc.) of the ok interface button would confirm the user's desire to delete the selected signer description and the cancel interface button would abort the deletion of the selected description. After confirmation for the deletion has been received at block 482, the delete routine 414 ends its execution and returns control to the authorization setup routine 404.

Figure 12:
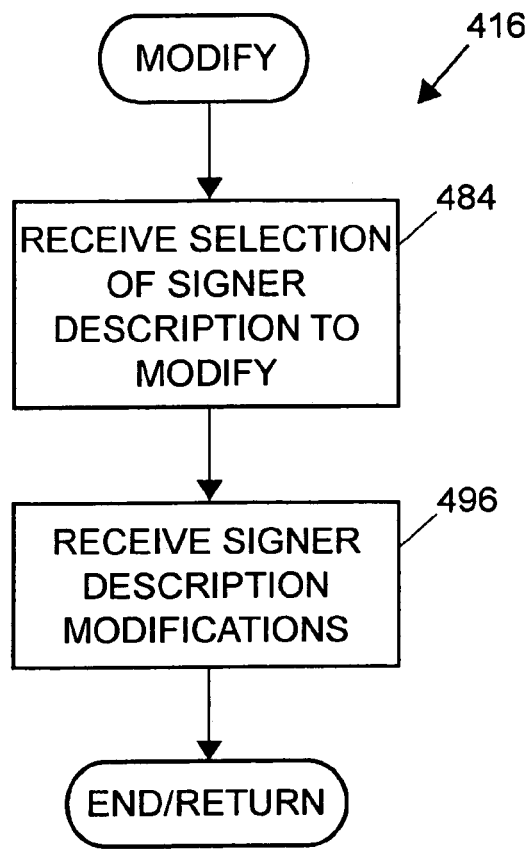
FIG. 12 is an exemplary flow diagram of a modify routine.
Figure 13:
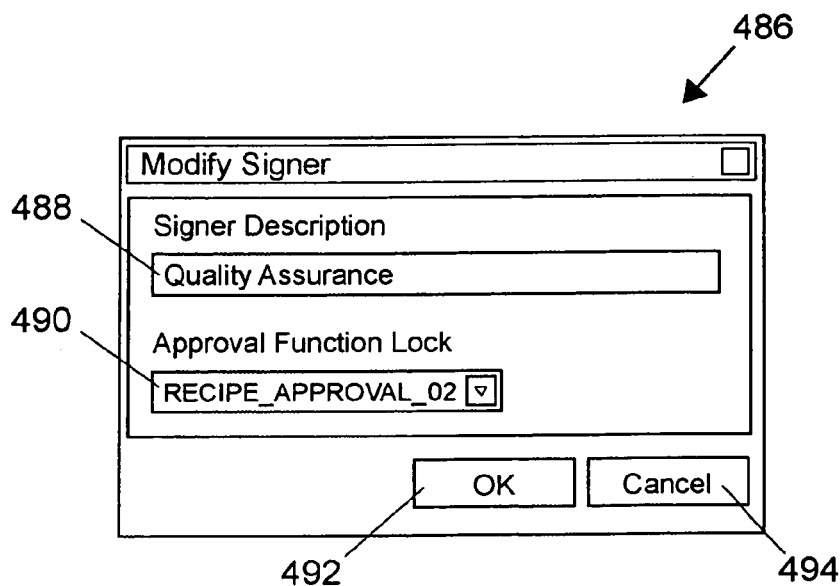
FIG. 13 is an exemplary user interface associated with the modify routine of FIG. 12.

Further detail regarding the modify routine 416 of FIG. 7 is provided in conjunction with FIGS. 12 and 13. The modify routine 416 begins execution at block 484, which receives from the user a selection of the signer description to modify. For example, the user may select the signer named Quality Assurance in FIG. 8 and may then actuate the modify interface button 426. After actuation of the modify interface button 426, a user interface such as, for example, a user interface 486 shown in FIG. 13, may be presented to the user and may include a signer description box 488 and an approval function lock box 490. The user interface 486 may also include ok and cancel interface buttons 492 and 494. After the modify routine 416 has received a selection of the signer description to modify (in this case, the signer Quality Assurance has been selected for modification), control passes from block 484 to block 496. The block 496 receives signer description modifications, such as, for example, changes in the signer name, approval lock function or any other suitable changes. For example, after the user provides a signer description in block 488, the user may modify the name of the signer or may modify the approval lock function displayed in block 490 and may select either of the ok or cancel interface buttons 492 and 494. As described previously, actuation of the ok interface button 492 saves the modifications made to the signer description. Conversely, actuation of the cancel interface button 494 ends the modify routine 416 without saving changes made. In any case, actuation of either of the interface buttons 492 and 494 ends the execution of the modify routine 416 and returns control to the authorization setup routine 404 of FIG. 7. As with the add routine 412, modification of a signer or approver automatically results in any previously approved recipe requiring that signer's approval to become unauthorized.

Thus far, a description of adding, deleting and modifying signers or recipe reviewers or approvers has been provided. The described routines or routines embodying the functionality described in connection with these routines may be implemented within any of the workstations 14 and/or terminals 32 of FIG. 1 or with any of the workstations 116 of FIG. 4.

While the preceding figures and description have pertained to the specification of signers, FIGS. 14–18 pertain to the review, approval or rejection processes that may be carried out by signers. The routines and user interfaces shown in FIGS. 14–18 may be implemented on the terminals 32 and/or the workstations 14 of FIG. 1 or on any of the workstations 116 of FIG. 4. In particular, the one or more of the memories 20 and 34 may store instructions that may be executed by one or more of the processors 21 and 36 to carry out operations representative of the blocks in the routines.

Figure 14:
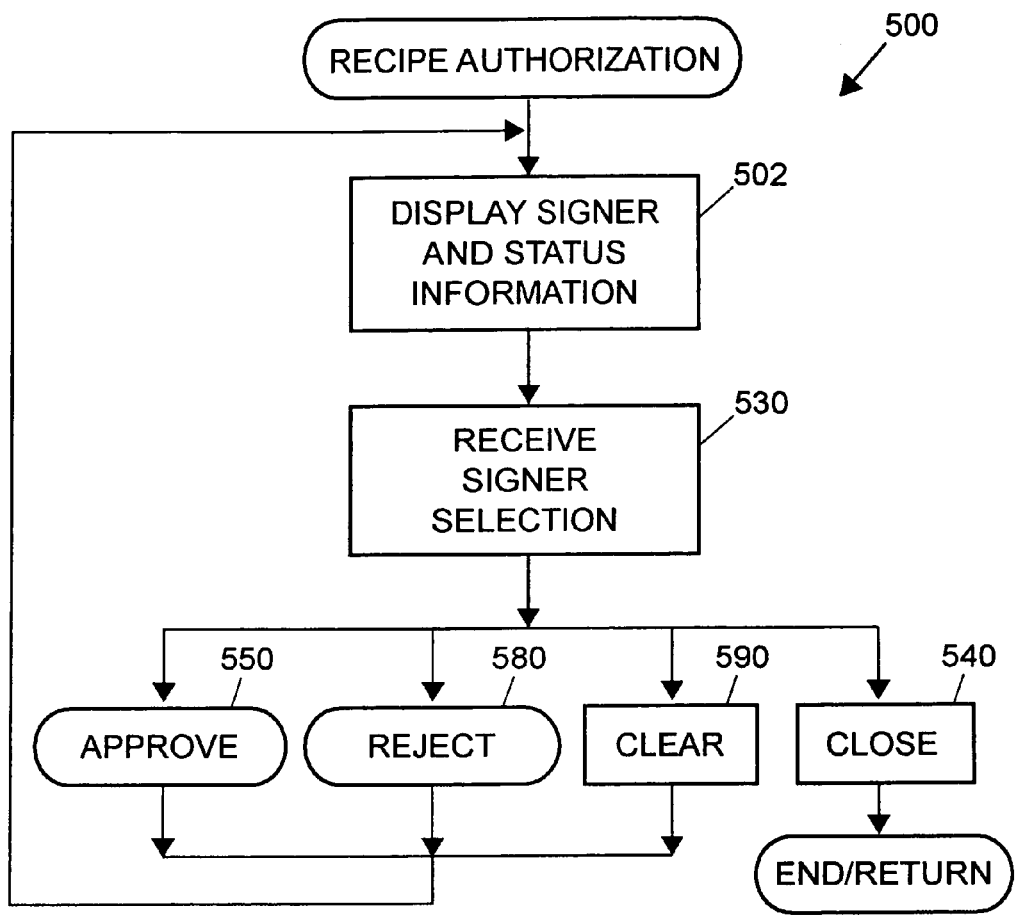
FIG. 14 is an exemplary flow diagram of a software object authorization routine.
Figure 15:
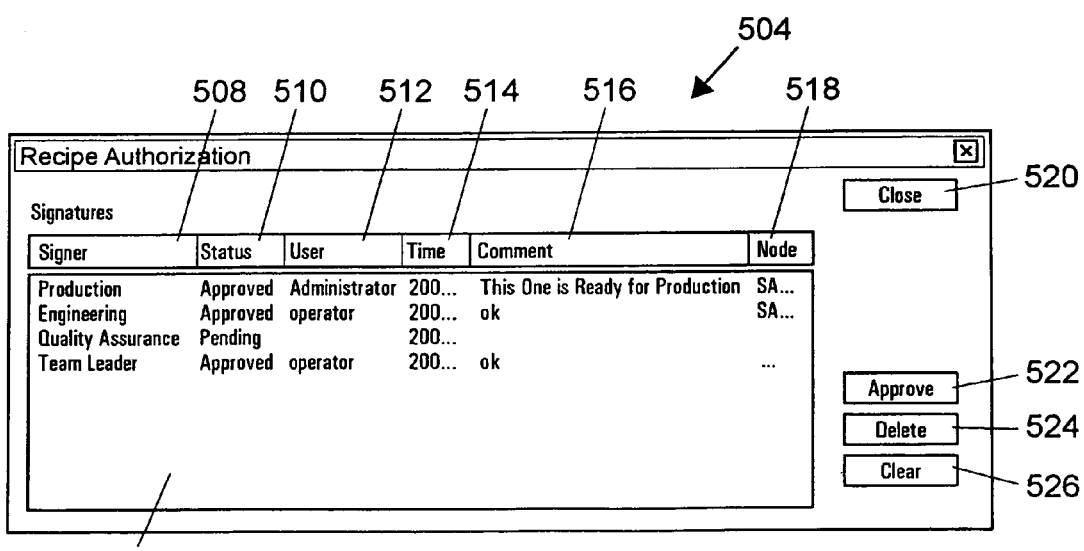
FIG. 15 is an exemplary user interface associated with the software object authorization routine of FIG. 14.

Turning now to FIG. 14, a recipe authorization routine 500 begins execution at block 502, which displays signer and status information pertinent to the recipe being reviewed. For example, a user interface 504 of FIG. 15 may include a text box 506 having a number of columns 508–518 that may represent signer identity, status, user type, time, comment and node. The signer column 508 lists the signatures required for approval of the recipe and the status column 510 lists the state of the signature for each signer. For example, signature status may be blank or pending, approved or rejected, wherein a blank status or pending status may represent that the signer has not reviewed the recipe. The user column 512 lists the user type responsible for the most recent signature change. The time column 514 lists the time at which most recent change of the signature was made. The comment column 516 lists any comments made by the signer when they approved or rejected the recipe and the node 518 represents the systems node at which the signer approved or rejected the recipe. For example, the node may be any one of the terminals 32 and/or the workstations 14 of FIG. 1 or the workstations 116 of FIG. 4. In addition to the text block 506, the user interface 504 may include close, approve, reject and clear interface buttons 520–526, which will be described in conjunction with the recipe authorization routine 500 of FIG. 14.

After block 502 displays signer and status information, block 530 receives the signer selection, which may be manifest by the user by selecting any of interface buttons 520–526. In particular, if the user actuates the close interface button 520, control of the recipe authorization routine 500 passes from block 530 to block 540, which closes the user interface 504, ends execution of the recipe authorization routine 500 and returns control to any routine that called the recipe authorization routine 500.

Figure 16:
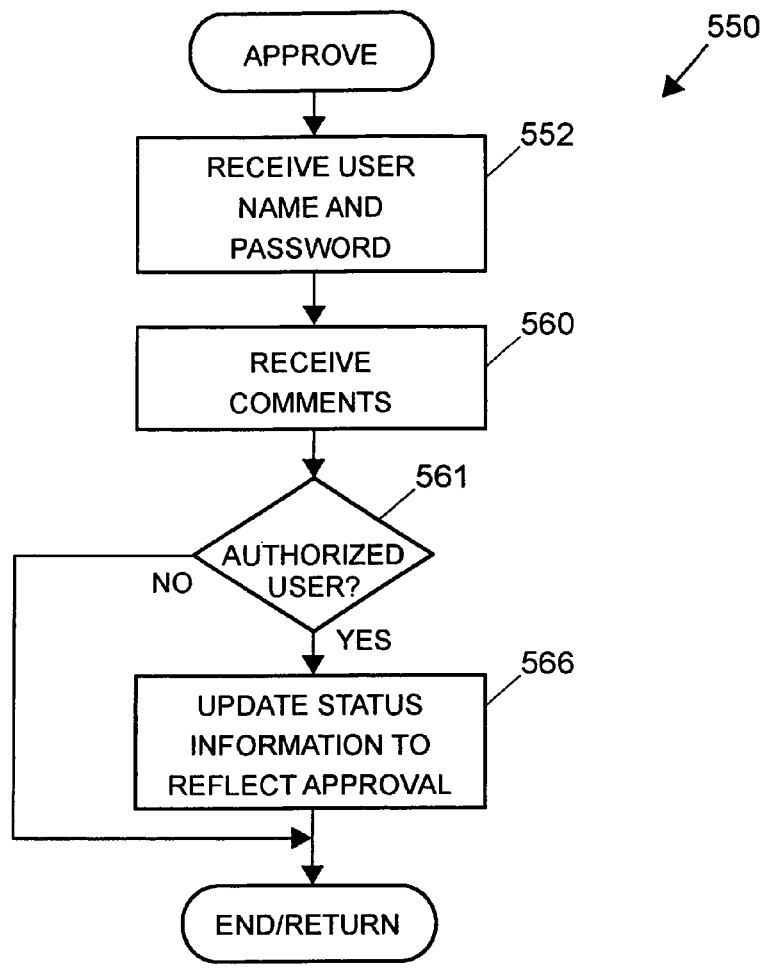
FIG. 16 is an exemplary flow diagram of an approve routine.

Alternatively, if the user actuates the approve interface button 522, control passes from block 530 to block 550, which represents an approve routine. As shown in FIG. 16, the approve routine 550 begins execution at block 552, which receives a user name and password that are provided by the user. A user interface 554, an example of which is shown in FIG. 17, may include user name and password boxes 556 and 558 into which the user may enter their user name and password.

After block 552 has completed execution, control passes to block 560, which receives user comments made during approval. For example, the user interface 554 of FIG. 17 may include a text box 562 into which comments may be keyed. After block 560 completes execution, block 561 determines if the user is authorized. The authorization check performed at block 561 may verify that the user name and/or password received at block 552 are valid and/or whether the user associated with that user name and password is authorized to make such an approval. If it is determined at block 561 that the user is authorized, then control passes to block 566. Block 566 updates the status information to reflect approval. For example, the text box 562 includes the text comments "This one is ready for production," which is also reflected in FIG. 15 as the comment made by the production signer when approving the recipe after the execution of block 566. If it is determined at block 561 that either or both of the user name and password received at block 552 are not authorized, then the approve routine 550 ends.

Figure 17:
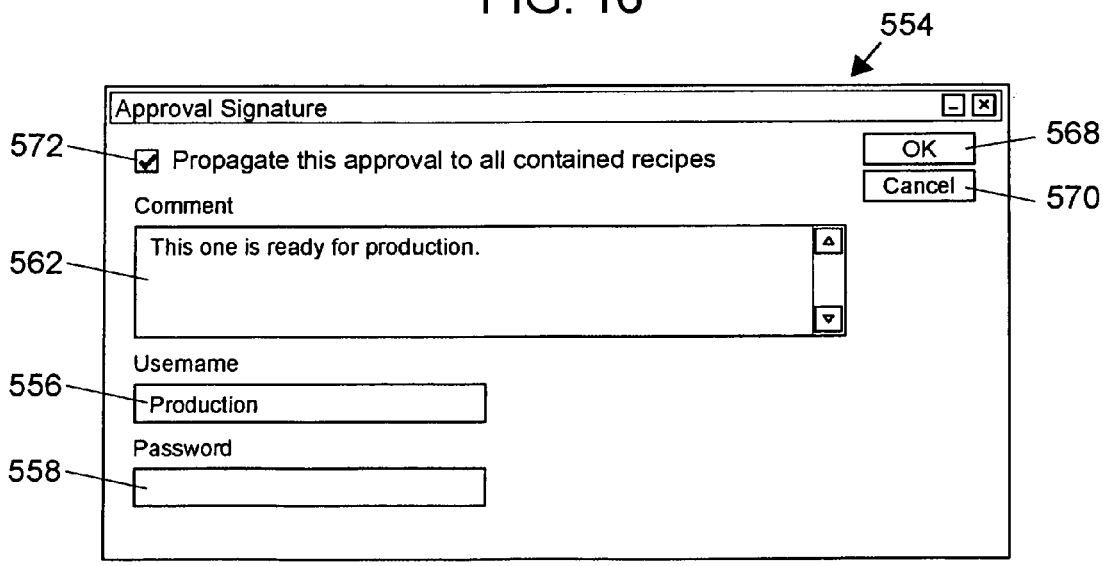
FIG. 17 is an exemplary user interface associated with the approval routine of FIG. 16.

As described in conjunction with many of the previous user interface screens, the user interface 554 of FIG. 17 includes ok and cancel interface buttons 568 and 570, which may be used to end execution of the approve routine 550 while either saving or discarding the changes made during the execution of the routine. Additionally, as shown in FIG. 17, a check box 572 may be provided to enable a user to opt to propagate the approval to any contained or sub-recipes.

Figure 18:
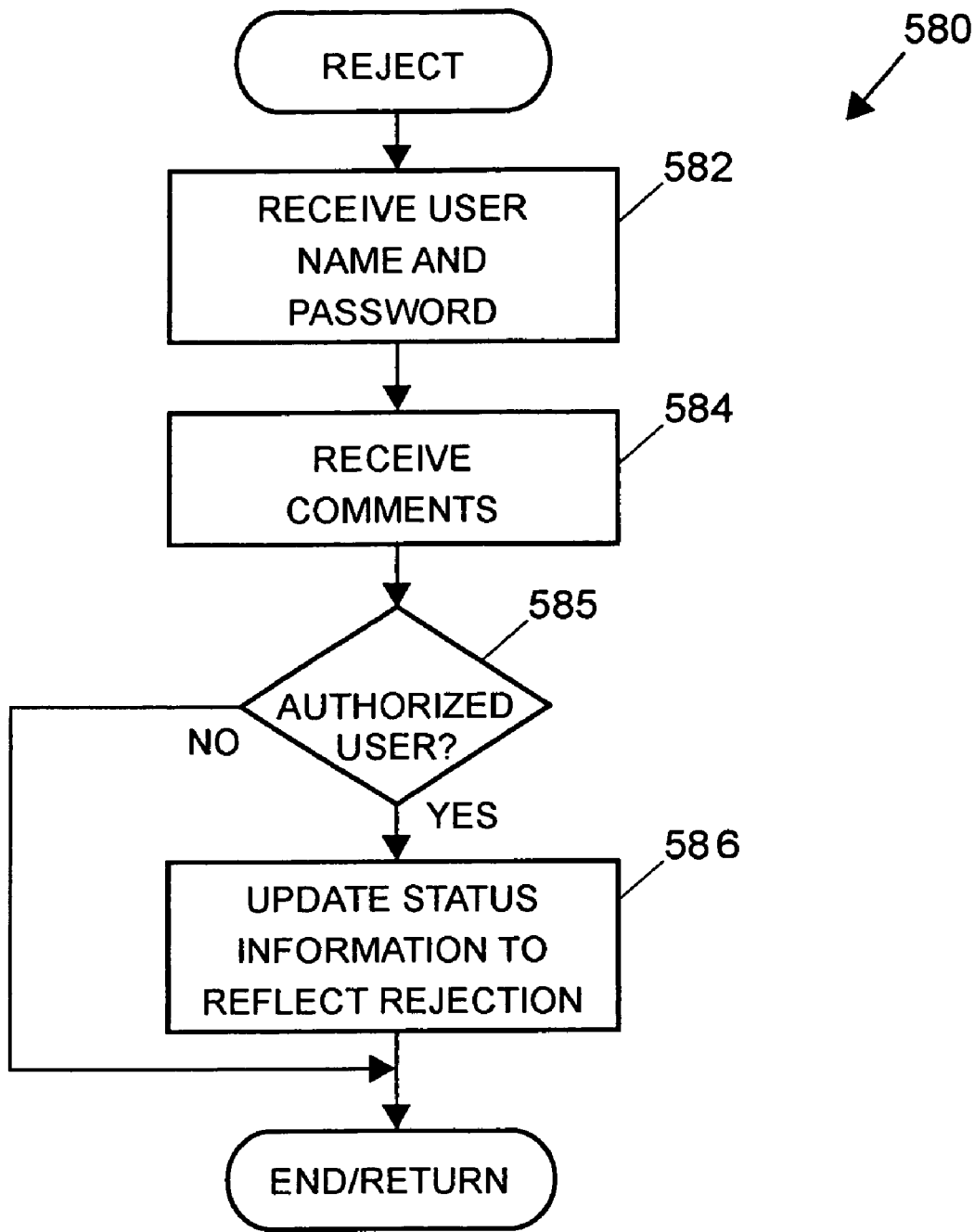
FIG. 18 is an exemplary flow diagram of a reject routine.

Referring back to FIGS. 14 and 15, if the user actuates the reject interface button 524 of FIG. 15, control passes from block 530 to block 580 of the recipe authorization routine 550. Block 580 represents a reject routine, further details of which may be found in FIG. 18. As shown in FIG. 18, execution of the reject routine 580 begins at block 582 where the user inputs a user name and a password before control passes to block 584. At block 584, a signer may input comments made during the process of rejecting the recipe. The operations of blocks 582 and 584 are similar to the operations of blocks 552 and 560 of the approve routine 550 shown in FIG. 16, except that blocks 582 and 584 are used in conjunction with rejecting the recipe. After the block 584 completes execution, control passes to block 585, which performs an authorization check similar to that performed at block 561 shown in FIG. 17. If it is determined that a user is authorized at block 585, then control passes to block 586.

Block 586 updates status information to reflect rejection of the recipe by the user. The update status information block 586 may generate information that would be reflected on the user interface 504 of FIG. 15 to reflect the fact that a signer has rejected a recipe. Although not shown in the figures, the reject routine 580 may also employ a graphical user interface similar to the user interface 554 of FIG. 17, which is used to approve recipes.

Returning again to FIGS. 14 and 15, if a user actuates the clear interface button 526 of FIG. 15, control passes from block 530 to block 590 of the recipe authorization routine 500. The block 590 may be used to clear a signature. For example, one of the signers shown in FIG. 15 may be selected by a user and cleared using the interface button 526. However, once a recipe has been downloaded for execution by, for example, the controller 12 (FIG. 1) or the workstation 14 (FIG. 1), the effect of an approval signature cannot be retracted. In other words, once a recipe (or any other software object) has been downloaded, a signature (i.e., an approval) cannot be cleared or rejected.

Figure 19:
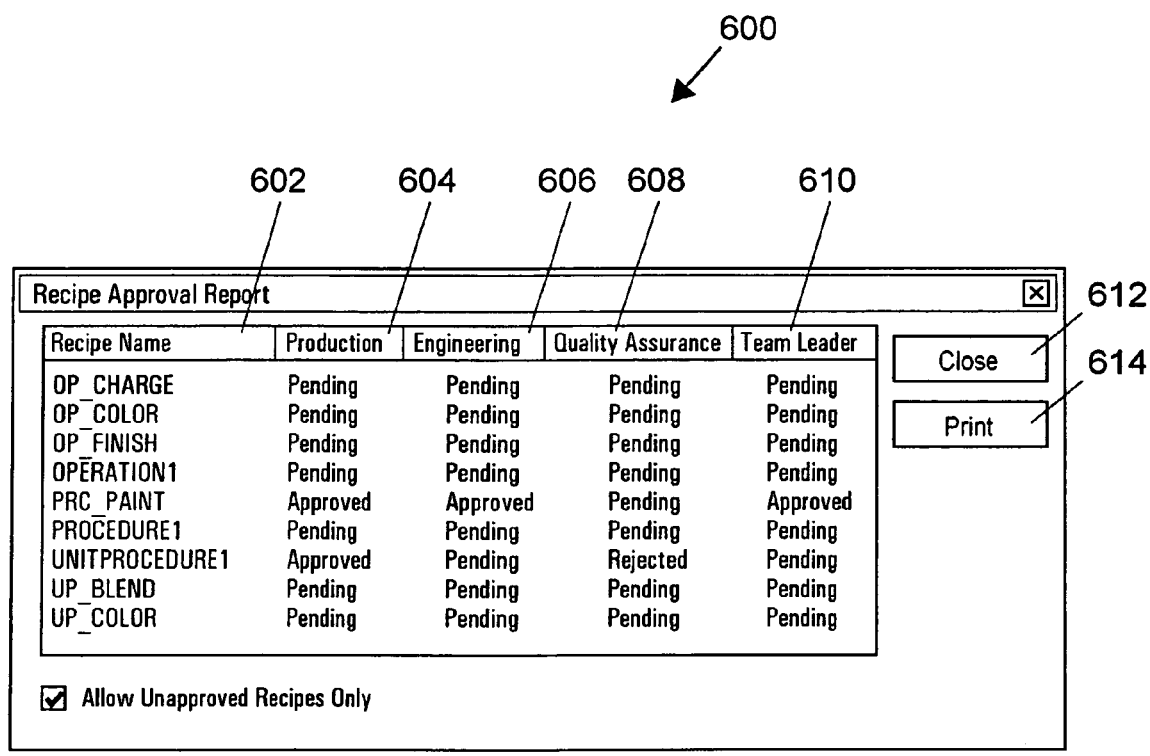
FIG. 19 is an exemplary user interface of showing the status of unapproved software objects.

While the foregoing description pertains to selecting signers and to reviewing recipes, a user interface 600, as shown in FIG. 19, may be used to report the status of recipes within the process control system 10. For example, the user interface 600 may include a number of columns 602–610, which respectively represent recipe name, production, engineering, quality assurance and team leader. Briefly, the recipe name column 602 lists all of the unapproved recipes and columns 604–610 list the status of each recipe with each reviewer or reviewing entity. For example, the recipe named "OP_CHARGE" is pending with each of production, engineering, quality assurance and team leader. In contrast, each of production, engineering, quality assurance and team leader have approved the "PRC_PAINT" recipe, but the same has not been approved by quality assurance. Accordingly, the "PRC_PAINT" recipe is still unapproved. The user interface 600 may also include close and print interface buttons 612 and 614, which may be used to close the user interface 600 or to print the user interface 600 to show the information contained in the columns 602–610.

Figure 20:
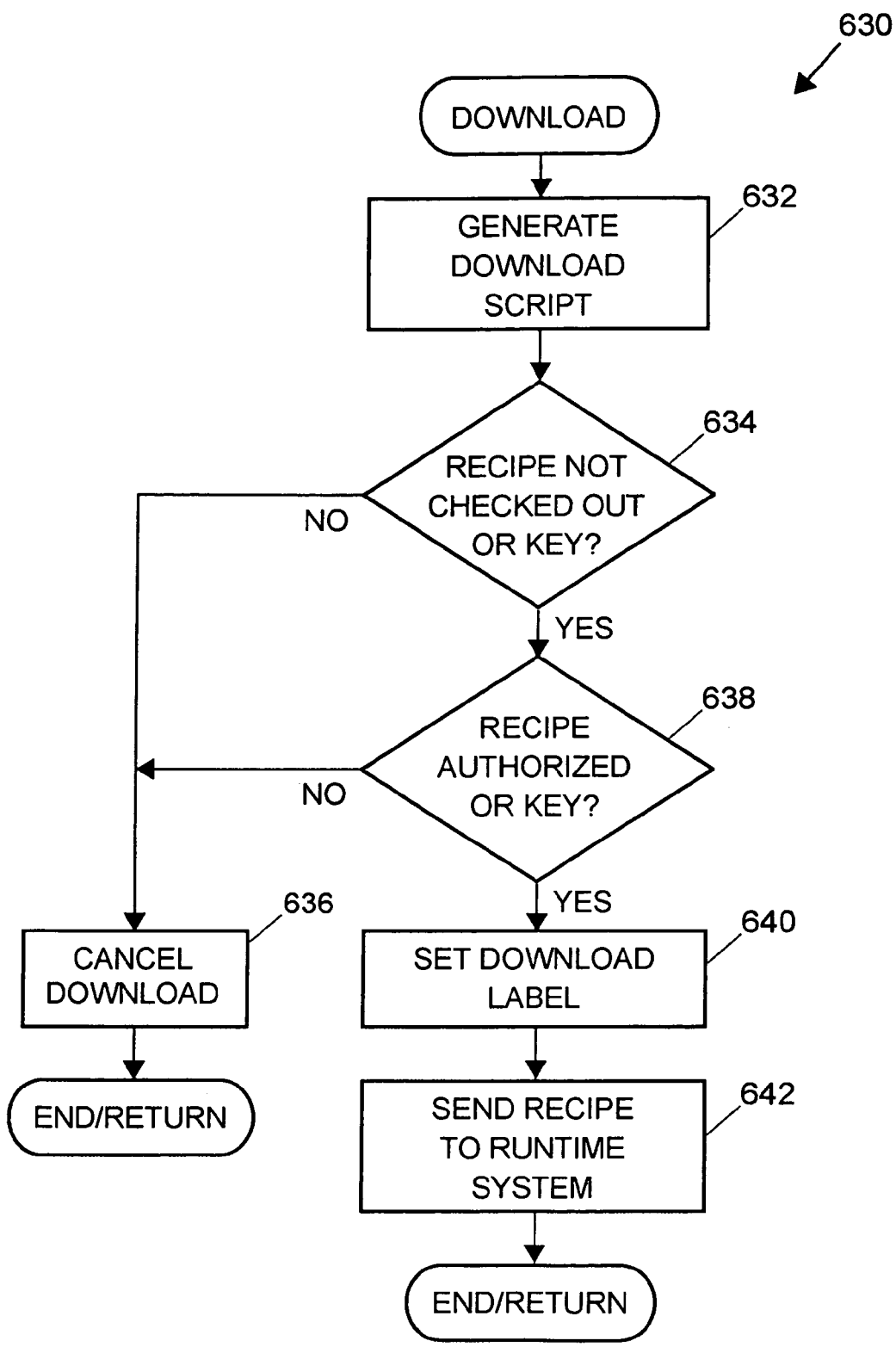
FIG. 20 is an exemplary flow diagram of a download routine.

Once a recipe has been reviewed and approved by all signers, the recipe may be downloaded to or implemented within one or more of the controllers 12, which are shown in FIG. 1 or the controllers 176 of FIG. 4 or (or other software objects may be downloaded to the safety logic modules 150–156 of FIG. 4 or any of the field devices to which these objects may need to be downloaded). A download routine 630, as shown in FIG. 20, is one method by which downloading may be carried out. The download routine 630 begins execution at block 632, which generates a download script. After the download script has been generated at block 632, control passes to block 634, which determines if the recipe is not checked out (i.e., is checked in) or if the user has supplied a key which enables downloading of a recipe even if the recipe is checked out. Version control software such as the software disclosed in U.S. Pat. No. 6,449,624 may be used in connection with the download routine 630. If block 634 determines that the recipe is checked out and the key has not been provided, control passes to block 636, which cancels the download and ends execution of the download routine 630. Alternatively, if the recipe is not checked out or if the key has been provided, control passes from block 634 to block 638, which determines if the recipe is authorized or if the user has provided a special key which enables downloading of unauthorized recipes. Recipe authorization may include, but is not limited to, insuring that all signers have approved the recipe. If block 638 determines that the recipe is not authorized and the key has not been provided, control passes to block 636, which cancels the download before ending the download routine 630. In the alternative, if block 638 determines that the recipe is authorized or if the key has been provided, control passes to block 640, which sets a download label. The download label may be one or more comment statements or other similar textual information appended to the downloaded item(s) that includes the time, date, version and initiator (or user) of the download. Additionally, the download label includes a detailed list of the individual items (e.g., recipes) being downloaded. The recipe is then sent to the runtime system, which may be embodied in for example, the controllers 12 of FIG. 1, at block 642. After the execution of block 642, the download routine 630 ends execution and returns control to the routine that called the download routine 630.

From the foregoing, it can be appreciated that a software object that is currently not approved cannot be downloaded or implemented by the process control or safety system until all signers or approvers associated with that software object have approved the software object. Thus, a new software object or recipe, for example, must be approved by a predetermined list or group of persons and/or other entities (e.g., a list of persons and/or other entities generated by the authorization setup routine 404 (FIG. 7). Additionally, a previously approved software object or recipe that is modified automatically becomes unauthorized and, thus, must be re-approved by all of its corresponding signers or authorizers to download the modified software object or recipe as shown by example at blocks 638 and 640 of FIG. 20.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A software object approval method for use in a safety instrumented system, the method comprising:

obtaining electronic identification information representing a group of entities whose approval is needed prior to implementing a software object within a safety instrumented system in response to a change being made to the software object in a software object design environment;

electronically transmitting a request for review of the software object to each of the entities within the group of entities;

receiving from each entity within the group of entities an electronic indication regarding an approval or a disapproval of the software object; and preventing the implementation of the software object in the safety instrumented system until each entity within the group of entities provides an electronic indication approving the software object.

2. The method of claim 1, wherein electronically transmitting the request for review of the software object includes electronically notifying each entity within the group of entities via a communication network.

3. The method of claim 2, wherein electronically transmitting the request includes sending an electronic mail message to each entity within the group of entities.

4. The method of claim 1, wherein preventing the implementation of the software object in the safety instrumented system until each entity within the group of entities provides an electronic indication approving the software object includes allowing the software object to be downloaded to the safety instrumented system if each entity within the group of entities approves the software object.

5. The method of claim 1, wherein obtaining electronic identification information representing a group of entities includes determining a risk reduction factor and selecting the group of entities based on the risk reduction factor.

6. The method of claim 5, wherein obtaining electronic identification information representing a group of entities includes determining a safety instrumentation level from the risk reduction factor and selecting the group of entities based on the determined safety instrumentation level.

7. The method of claim 6, wherein obtaining electronic identification information representing a group of entities includes determining the number of persons in the group of entities from the safety instrumentation level.

8. The method of claim 6, wherein obtaining electronic identification information representing a group of entities includes determining the job positions of the persons in the group of entities from the safety instrumentation level.

9. The method of claim 1, further including logging the electronic indication regarding the approval or the disapproval of the software object received from one or more of the entities within the group of entities.

10. The method of claim 1, wherein obtaining electronic identification information representing a group of entities whose approval is needed includes prompting a designer for the electronic identification information.

11. The method of claim 1, wherein obtaining electronic identification information representing a group of entities whose approval is needed includes determining the number of persons in the group of entities.

12. The method of claim 1, wherein preventing the implementation of the software object includes preventing the software object from being downloaded to a control environment.

13. The method of claim 1, wherein preventing the implementation of the software object in the safety instrumented system includes storing an override key and enabling a user to use the override key to download the software object in the safety instrumented system before each entity within the group of entities provides an electronic indication approving the software object.

14. The method of claim 1, further including detecting when the change is made to the software object in the software object design environment.

15. The method of claim 14, wherein detecting when the change is made to the software object in the software object design environment includes changing a version number associated with the software object when the change is made to the software object.

16. The method of claim 14, wherein detecting when the change is made to the software object in the software object design environment includes detecting when a new software object is created in the software object design environment.

17. The method of claim 14, wherein detecting when the change is made to the software object in the software object design environment includes detecting when a user initiates an approval procedure in the software design environment.

18. The method of claim 1, further including monitoring a software object for testing purposes to determine when a test for the software object is overdue.

19. The method of claim 18, wherein determining when a test for the software object is overdue includes calculating a new risk reduction factor for the software object after the test for the software object is overdue, and comparing the new risk reduction factor to the original risk reduction factor for the software object.

20. The method of claim 18, further including generating an alarm signal to be sent to a user when the test for the software object is overdue.

21. The method of claim 18, further including generating a work order to be sent to a user when the test for the software object is overdue.

22. A software object approval system for use in a process control system including a processor, the software object approval system comprising:

a computer readable medium; and software stored on the computer readable medium and adapted to be executed by the processor to:

obtain electronic identification information representing a group of entities whose approval is needed prior to implementing a software object on-line within the process control system after a change is made to the software object in a software object design environment;

electronically transmit a request for review of the software object to each of the entities within the group of entities;

receive from each entity within the group of entities an electronic indication regarding an approval or a disapproval of the software object; and prevent the implementation of the software object in the process control system until each entity within the group of entities provides an electronic indication approving the software object.

23. The software object approval system of claim 22, wherein the software electronically transmits a request by sending an electronic mail message to each entity within the group of entities.

24. The software object approval system of claim 22, wherein the software obtains electronic identification information representing the group of entities by determining a risk reduction factor and selecting the group of entities based on the risk reduction factor.

25. The software object approval system of claim 24, wherein the software obtains electronic identification information representing the group of entities by determining a safety instrumentation level from the risk reduction factor and selecting the group of entities based on the determined safety instrumentation level.

26. The software object approval system of claim 25, wherein the software obtains electronic identification information representing the group of entities by determining the number of persons in the group of entities based on the safety instrumentation level.

27. The software object approval system of claim 25, wherein the software obtains electronic identification information representing the group of entities by determining the job positions of the persons in the group of entities based on the safety instrumentation level.

28. The software object approval system of claim 22, wherein the software logs the electronic indication regarding the approval or the disapproval of the software object received from one or more of the entities within the group of entities.

29. The software object approval system of claim 22, wherein the software obtains electronic identification information representing the group of entities whose approval is needed by prompting a designer for the electronic identification information.

30. The software object approval system of claim 22, wherein the software detects when the change is made to the software object in the software object design environment.

31. The software object approval system of claim 30, wherein the software detects when the change is made to the software object in the software object design environment by detecting when a new software object is created in the software object design environment.

32. The software object approval system of claim 30, wherein the software detects when the change is when a user initiates an approval procedure in the software design environment.

33. The software object approval system of claim 30, wherein the software changes a version number associated with the software object when the software detects that the change is made to the software object in the software object design environment.

34. The software object approval system of claim 22, wherein the software stores an override key and enables a user to use the override key to download the software object in the process control system before each entity within the group of entities provides an electronic indication approving the software object.

35. The software object approval system of claim 22, wherein the software further monitors the software object when the software object is downloaded to the process control system for testing purposes to determine when a test for the software object is overdue.

36. The software object approval system of claim 35, wherein the software determines when a test for the software object is overdue by calculating a new risk reduction factor for the software object after the test for the software object is overdue, and compares the new risk reduction factor to the original risk reduction factor for the software object.

37. The software object approval system of claim 36, wherein the software further generates an alarm signal to be sent to a user when a test for the software object is determined to be overdue.

38. The software object approval system of claim 36, wherein the software further generates a work order to be sent to a user when a test for the software object is determined to be overdue, the work order specifying a test to be performed for the software object.

39. The software object approval system of claim 22, wherein the software object is a safety system software object to be used to implement safety procedures in the process control system.

40. An approval system for use in a process control or safety instrumented system in a process plant having one or more processors, the approval system comprising:
a computer readable medium;
a first routine stored on the computer readable medium and adapted to be executed on the one or more of the processors to electronically transmit a request for review of the software object to each entity within a group of entities in response to a change being made to the software object; and
a second routine stored on the computer readable medium and adapted to be executed on the one or more of the processors to prevent implementation of the software object in the process control or safety instrumented system until each entity within the group of entities provides an electronic indication approving the software object.

41. The approval system of claim 40, further including a third routine that is adapted to be executed on the one or more of the processors to obtain electronic identification information representing the group of entities whose approval is needed prior to implementing the software object within the process control or safety instrumented system.

42. The approval system of claim 41, wherein the third routine is adapted to obtain the electronic identification information representing the group of entities by determining a risk reduction factor and selecting the group of entities based on the risk reduction factor.

43. The approval system of claim 42, wherein the third routine is adapted to obtain the electronic identification information representing the group of entities by determining a safety instrumentation level from the risk reduction factor and selecting the group of entities based on the determined safety instrumentation level.

44. The approval system of claim 43, wherein the third routine is adapted to obtain the electronic identification information representing the group of entities by determining a number of persons in the group of entities based on the safety instrumentation level.

45. The approval system of claim 43, wherein the third routine is adapted to obtain the electronic identification information representing the group of entities by determining job positions of persons in the group of entities based on the safety instrumentation level.

46. The approval system of claim 40, wherein the first routine is adapted to electronically transmit a request by sending an electronic mail message to each entity within the group of entities.

47. The approval system of claim 40, wherein the second routine is adapted to log the electronic indication regarding an approval or a disapproval of the software object received from one or more of the entities within the group of entities.

48. The approval system of claim 40, including a third routine adapted to be executed on the one or more of the processors to obtain the electronic identification information representing the group of entities whose approval is needed by prompting a person for the electronic identification information.

49. The approval system of claim 40, wherein the second routine is adapted to store an override key and to enable a user to use the override key to download the software object in the process control safety instrumented system before each entity within the group of entities provides an electronic indication approving the software object.

50. The approval system of claim 40, including a third routine stored on the computer readable medium and adapted to be executed on the one or more of the processors to detect when the change is made to the software object.

51. The approval system of claim 50, wherein the third routine is adapted to change a version number associated with the software object in response to the first routine detecting a change being made to the software object.

52. The approval system of claim 50, wherein the third routine is adapted to detect when a change is made to the software object by detecting when a new software object is created in a software object design environment.

53. The approval system of claim 50, wherein the third routine is adapted to detect when a change is made to the software object by detecting when a user initiates an approval procedure in a software design environment.

54. The approval system of claim 40, further including a third routine adapted to be executed on the one or more of the processors to monitor a software object that is operating on-line in the process control or safety instrumented system for testing purposes to determine when a test for the software object is overdue.

55. The approval system of claim 54, wherein the third routine is adapted to determine when a test for the software object is overdue by calculating a new risk reduction factor for the software object after the test for the software object is overdue and by comparing the new risk reduction factor to an original risk reduction factor for the software object.

56. The approval system of claim 55, wherein the third routine is adapted to generate an alarm signal to be sent to a user when the new risk reduction factor differs from the original risk reduction factor by a particular amount.

57. The approval system of claim 55, wherein the third routine is adapted to generate a work order to be sent to a user when the new risk reduction factor differs from the original risk reduction factor by a particular amount, the work order specifying a test to be performed for the software object.

* * * * *

UNITED STATES PATENT AND TRADEMARK OFFICE
CERTIFICATE OF CORRECTION

PATENT NO. : 7,076,312 B2
APPLICATION NO. : 10/666446
DATED : July 11, 2006
INVENTOR(S) : Gary K. Law et al.

It is certified that error appears in the above-identified patent and that said Letters Patent is hereby corrected as shown below:

At Column 1, line 52, "used ip" should be -- used in --.

At Column 2, line 1, "parameters," should be -- parameters --.

At Column 8, line 48, "approval." should be -- approval --.

At Column 12, line 30, "separete" should be -- separate --.

At Column 14, line 47, "150∞56" should be -- 150-156 --.

At Column 17, line 31, "assess a stored a list" should be -- access a stored list --.

At Column 24, line 64, "(FIG. 7)." should be -- (FIG. 7)). --.

At Column 27, line 9, "detennining" should be -- determining --.

Signed and Sealed this

Fourteenth Day of August, 2007

JON W. DUDAS
*Director of the United States Patent and Trademark Office*